United States Patent
Suzuki et al.

(10) Patent No.: US 9,277,238 B2
(45) Date of Patent: Mar. 1, 2016

(54) MOVING IMAGE ENCODING AND DECODING SYSTEM

(75) Inventors: Yoshinori Suzuki, Saitama (JP);
Choong Seng Boon, Yokohama (JP);
Jens-Rainer Ohm, Aachen (DE);
Mathias Wien, Aachen (DE);
Aleksandar Stojanovic, Aachen (DE);
Thiow Keng Tan, Singapore (SG)

(73) Assignee: NTT DOCOMO, INC., Tokyo (JP)

( * ) Notice: Subject to any disclaimer, the term of this patent is extended or adjusted under 35 U.S.C. 154(b) by 1234 days.

(21) Appl. No.: 13/051,768

(22) Filed: Mar. 18, 2011

(65) Prior Publication Data

US 2011/0222601 A1 Sep. 15, 2011

Related U.S. Application Data

(63) Continuation of application No. PCT/JP2009/065945, filed on Sep. 11, 2009.

(30) Foreign Application Priority Data

Sep. 19, 2008 (JP) ................................ 2008-241128
Apr. 22, 2009 (JP) ................................ 2009-104084

(51) Int. Cl.
*H04N 19/51* (2014.01)
*H04N 19/593* (2014.01)
*H04N 19/573* (2014.01)

(52) U.S. Cl.
CPC ............. *H04N 19/573* (2014.11); *H04N 19/51* (2014.11); *H04N 19/593* (2014.11)

(58) Field of Classification Search
CPC ........ H04N 7/345; H04N 7/362; H04N 7/366
USPC .................................................... 375/240.12
See application file for complete search history.

(56) References Cited

U.S. PATENT DOCUMENTS 6,259,739 B1   7/2001 Kondo
6,909,807 B2 * 6/2005 Chu ....................... H04N 19/90
                                                       375/E7.2

(Continued)

FOREIGN PATENT DOCUMENTS

JP        60-235528       11/1985
JP        60-235528 A     11/1985

(Continued)

OTHER PUBLICATIONS

Doretto, G., Jones, E., Soatto, S., "Spatially Homogeneous Dynamic Textures," Apr. 22, 2004; Computer Vision—ECCV 2004; Lecture Notes in Computer Science; LNCS) Springer-Verlag, Berlin/Heidelberg, pp. 591-602, XP019005856, ISBN: 978-3-540-21983-5.

(Continued)

*Primary Examiner* — Anner Holder
(74) *Attorney, Agent, or Firm* — Brinks Gilson & Lione

(57) ABSTRACT

A moving image encoding and decoding system reduces compressed moving picture data amounts by producing a prediction signal suitable for moving pictures including dynamic textures. The system includes a moving picture encoding device 1 that includes a block divider 102 receiving a target pixel signal, a prediction signal generator 103 producing a prediction signal, a subtractor 105 producing a differential signal, and a transformer 106 and quantizer 107 producing an encoded differential signal. The encoding device 1 also includes an inverse quantizer 108 and inverse transformer 109 producing a decoded differential signal, an adder 110 producing a reproduction signal, a frame memory 104 storing the reproduction signal as a reference image, and a reference image generator 113. The reference image generator 113 may obtain an observation matrix C by using a pre-existing reference image. The encoding system 1 produces a new reference image $y''_{t+5}$ based on the observation matrix C and a state vector $x_{t+5}$, and stores the new reference image in the frame memory 104. The prediction signal generator 103 produces the prediction signal by using at least the new reference image $y''_{t+5}$.

25 Claims, 16 Drawing Sheets

(56) References Cited

U.S. PATENT DOCUMENTS

| | | | |
|---|---|---|---|
| 2003/0076334 A1 | 4/2003 | Dumitras et al. | 345/582 |
| 2003/0165271 A1* | 9/2003 | Boon | H04N 19/563 382/238 |
| 2004/0135788 A1* | 7/2004 | Davidson | G06T 17/00 345/530 |
| 2005/0286764 A1* | 12/2005 | Mittal | G06K 9/00771 382/181 |
| 2007/0053431 A1* | 3/2007 | Cammas | H04N 19/503 375/240.12 |
| 2007/0109409 A1 | 5/2007 | Yea et al. | 348/153 |
| 2007/0189626 A1* | 8/2007 | Tanizawa | H04N 19/176 382/251 |
| 2007/0242892 A1 | 10/2007 | Sugimoto et al. | |
| 2008/0212887 A1* | 9/2008 | Gori | G06K 9/4619 382/248 |

FOREIGN PATENT DOCUMENTS

| | | |
|---|---|---|
| JP | 2005-328457 | 11/2005 |
| JP | 2005-328457 A | 11/2005 |
| WO | WO 2004/039083 A1 | 5/2004 |
| WO | WO 2008/008331 A2 | 1/2008 |
| WO | WO 2010/032693 A1 | 3/2010 |

OTHER PUBLICATIONS

Budagavi, M., "Video Compression Using Blur Compensation," Image Processing 2005; ICIP 2005, IEEE, US, vol. 2, Sep. 11, 2005, pp. 882-885, XP010851195, DOI: 10.1109/ICIP.2005.1530197; ISBN: 978-0-7803-9134-5.

Dufaux, F., Moscheni, F., "Background Mosaicking for Low Bit Rate Video Coding," Proceedings of the International Conference on Image Processing (ICIP), Lausanne, Sep. 16-19, 1996; New York, IEEE, US, vol. 1, Sep. 16, 1996, pp. 673-676; XP010202155; DOI: 10.1109/ICIP.1996.559588; ISBN: 978-0-7803-3259-1.

Stojanovic, A., Wien, M., Ohm, J.R., "Dynamic Texture Synthesis for H.264/AVC Inter Coding," Image Processing 2008, ICIP 2008, 15$^{th}$ IEEE International Conference, IEEE, Piscataway, NJ, USA, Oct. 12, 2008, pp. 1608-1611, XP031374325, ISBN: 978-1-4244-1765-0.

Stojanovic, A., Wien, M., Tan, T.K., "Synthesis-in-the-Loop for Video Texture Coding," Image Processing (ICIP), 2009 16$^{th}$ IEEE International Conference on, IEEE, Piscataway, NJ, USA, Nov. 7, 2009, pp. 2293-2296; XP031629098; ISBN: 978-1-4244-5653-6.

Dumitras, A., Haskell, B., "An Encoder-Only Texture Replacement Method for Effective Compression of Entertainment Movie Sequences," 2002 IEEE, International Conference on Acoustics, Speech, and Signal Processing Proceedings (ICASSP), Orlando, FL May 13-17, 2002; IEEE, International Conference on Acoustics, Speech, and Signal Processing Proceedings (ICASSP) New York, NY, IEEE, US, May 13, 2002, pp. IV-3265, XP032015535; DOI: 10.1109/ICASSP.2002.5745350, ISBN: 978-0-7803-7402-7.

Zhu, C., Sun, X., Wu, F., Li, H., "Video Coding with Spatio-Temporal Texture Synthesis and Edge-Based Inpainting," Multimedia and Expo, 2008 IEEE, International Conference on, IEEE, Piscataway, NJ, USA, Jun. 23, 2008, pp. 813-816, XP031312846; ISBN: 978-1-4244-2570-9.

Extended European Search Report, issued in European Application No. 09814538.6, dated Feb. 24, 2012, 10 pgs.; European Patent Office, Munich, Germany.

Soatto, S. et al., "Dynamic Textures," Proceedings of the 8$^{th}$ IEEE International Conference on Computer Vision (ICCV), Vancouver, BC, Canada, Jul. 7-14, 2001, vol. 2, pp. 439-446.

Communication from the European Patent Office for European Application No. 09814538.6, dated Oct. 11, 2012, 5 pages.

Japanese Office Action, dated Jul. 9, 2013, pp. 1-11, with machine translation, Japanese Patent Application No. 2009-104084, Japanese Patent Office, Tokyo, Japan.

Soatto, S., Doretto, G., Wu, Y.N., "Dynamic Textures," Jul. 7-14, 2001, pp. 439-446, Proceedings Eighth IEEE International Conference on Computer Vision, Vancouver, British Columbia, Canada; © 2001 by the Institute of Electrical and Electronics Engineers, Inc.

Chinese Office Action, dated Jul. 12, 2013, pp. 1-34 with machine translation, Chinese Patent Application No. 200980116976.2, State Intellectual Property Office, Beijing, China.

European Summons to Attend Oral Proceedings, dated Jul. 30, 2013, pp. 1-6, European Patent Application No. 09814538.6, European Patent Office, Munich, Germany.

Extended European Search Report, dated Jan. 20, 2015, pp. 18, issued in European Patent Application No. 14185705.2, European Patent Office, Munich, Germany.

Richardson, Iain G., "H.264/MPEG4 Video Compression, Part 10, The Baseline Profile," pp. 170-177, John Wiley & Sons, 2003.

Richardson, Iain G., "H.264/MPEG4 Video Compression, Part 10, The Main Profile," pp. 206-213, John Wiley & Sons, 2003.

International Search Report for International Application No. PCT/JP2009/065945, dated Dec. 8, 2009, 3 pages.

Taiwan Office Action with English translation, dated Jul. 7, 2015, pp. 1-31, issued in Taiwan Patent Application No. 098131397, Taiwan Intellectual Property Office, Taipei City, Taiwan, R.O.C.

Taiwan Office Action with English translation, dated Nov. 23, 2015, pp. 1-6, issued in Taiwan Patent Application No. 098131397, Taiwan Intellectual Property Office, Taipei City, Taiwan, R.O.C.

* cited by examiner

| REFERENCE IMAGE NUMBER | REFERENCE IMAGE |
|---|---|
| 0 | $y_{t+4}$ |
| 1 | $y_{t+3}$ |
| 2 | $y_{t+2}$ |
| 3 | $y_{t+1}$ |
| 4 | $y_t$ |

902

| REFERENCE IMAGE NUMBER | REFERENCE IMAGE |
|---|---|
| 0 | $y_{t+4}$ |
| 1 | $y_{t+3}$ |
| 2 | $y_{t+2}$ |
| 3 | $y_{t+1}$ |
| 4 | $y''_{t+5}$ |

903

| REFERENCE IMAGE NUMBER | REFERENCE IMAGE |
|---|---|
| 0 | $y_{t+4}$ |
| 1 | $y_{t+3}$ |
| 2 | $y_{t+2}$ |
| 3 | $y''_{t+5}$ |
| 4 | $y_{t+1}$ |

904

| REFERENCE IMAGE NUMBER | REFERENCE IMAGE |
|---|---|
| 0 | $y_{t+4}$ |
| 1 | $y_{t+3}$ |
| 2 | $y''_{t+5}$ |
| 3 | $y_{t+2}$ |
| 4 | $y_{t+1}$ |

905

| REFERENCE IMAGE NUMBER | REFERENCE IMAGE |
|---|---|
| 0 | $y_{t+4}$ |
| 1 | $y''_{t+5}$ |
| 2 | $y_{t+3}$ |
| 3 | $y_{t+2}$ |
| 4 | $y_{t+1}$ |

906

| REFERENCE IMAGE NUMBER | REFERENCE IMAGE |
|---|---|
| 0 | $y''_{t+5}$ |
| 1 | $y_{t+4}$ |
| 2 | $y_{t+3}$ |
| 3 | $y_{t+2}$ |
| 4 | $y_{t+1}$ |

| REFERENCE IMAGE NUMBER | REFERENCE IMAGE |
|---|---|
| 0 | $y_{t+3}$ |
| 1 | $y_{t+4}$ |
| 2 | $y_{t+2}$ |
| 3 | $y_{t+1}$ |
| 4 | $y_t$ |

912

| REFERENCE IMAGE NUMBER | REFERENCE IMAGE |
|---|---|
| 0 | $y_{t+3}$ |
| 1 | $y_{t+4}$ |
| 2 | $y_{t+2}$ |
| 3 | $y_{t+1}$ |
| 4 | $y''_{t+5}$ |

913

| REFERENCE IMAGE NUMBER | REFERENCE IMAGE |
|---|---|
| 0 | $y_{t+3}$ |
| 1 | $y_{t+4}$ |
| 2 | $y_{t+2}$ |
| 3 | $y''_{t+5}$ |
| 4 | $y_{t+1}$ |

914

| REFERENCE IMAGE NUMBER | REFERENCE IMAGE |
|---|---|
| 0 | $y_{t+3}$ |
| 1 | $y_{t+4}$ |
| 2 | $y''_{t+5}$ |
| 3 | $y_{t+2}$ |
| 4 | $y_{t+1}$ |

915

| REFERENCE IMAGE NUMBER | REFERENCE IMAGE |
|---|---|
| 0 | $y_{t+3}$ |
| 1 | $y''_{t+5}$ |
| 2 | $y_{t+4}$ |
| 3 | $y_{t+2}$ |
| 4 | $y_{t+1}$ |

916

| REFERENCE IMAGE NUMBER | REFERENCE IMAGE |
|---|---|
| 0 | $y''_{t+5}$ |
| 1 | $y_{t+3}$ |
| 2 | $y_{t+4}$ |
| 3 | $y_{t+2}$ |
| 4 | $y_{t+1}$ |

| REFERENCE IMAGE NUMBER | REFERENCE IMAGE |
|---|---|
| 0 | $y_{t+2}$ |
| 1 | $y_{t+1}$ |
| 2 | $y_t$ |
| 3 | $y_{t+3}$ |
| 4 | $y_{t+4}$ |

922

| REFERENCE IMAGE NUMBER | REFERENCE IMAGE |
|---|---|
| 0 | $y_{t+2}$ |
| 1 | $y_{t+1}$ |
| 2 | $y_t$ |
| 3 | $y_{t+3}$ |
| 4 | $y''_{t+5}$ |

923

| REFERENCE IMAGE NUMBER | REFERENCE IMAGE |
|---|---|
| 0 | $y_{t+2}$ |
| 1 | $y_{t+1}$ |
| 2 | $y_t$ |
| 3 | $y''_{t+5}$ |
| 4 | $y_{t+3}$ |

924

| REFERENCE IMAGE NUMBER | REFERENCE IMAGE |
|---|---|
| 0 | $y_{t+2}$ |
| 1 | $y_{t+1}$ |
| 2 | $y''_{t+5}$ |
| 3 | $y_t$ |
| 4 | $y_{t+3}$ |

925

| REFERENCE IMAGE NUMBER | REFERENCE IMAGE |
|---|---|
| 0 | $y_{t+2}$ |
| 1 | $y''_{t+5}$ |
| 2 | $y_{t+1}$ |
| 3 | $y_t$ |
| 4 | $y_{t+3}$ |

926

| REFERENCE IMAGE NUMBER | REFERENCE IMAGE |
|---|---|
| 0 | $y''_{t+5}$ |
| 1 | $y_{t+2}$ |
| 2 | $y_{t+1}$ |
| 3 | $y_t$ |
| 4 | $y_{t+3}$ |

)# MOVING IMAGE ENCODING AND DECODING SYSTEM

This application is a continuation of PCT/JP2009/065945, filed Nov. 9, 2009, which claims the benefit of the filing date under 35 U.S.C. §119(e) of JP2008-241128, filed Sep. 19, 2008, and JP 2009-104084, filed Apr. 22, 2009, all of which are incorporated herein by reference.

TECHNICAL FIELD

The present invention relates to a moving picture encoding device, a moving picture decoding device, a moving picture encoding method, a moving picture decoding method, a moving picture encoding program, and a moving picture decoding program. Particularly, the invention relates to producing a prediction signal in prediction encoding and prediction decoding.

BACKGROUND ART

A compression encoding technology is used to efficiently transmit and store moving picture data. For example, as moving picture technology, MPEG-1, 2, 4, and H.261 to H.264 standards are widely used. In such moving picture encoding technology, a prediction signal of a target image serving as an encoding target is produced by using adjacent images side by side on a temporal axis and then a difference between the target image and the prediction signal is encoded, thereby realizing a data amount reduction. This technique is called inter-frame encoding.

For example, in an encoding method specified by the H.264 standard, one frame image is divided into block regions each composed of 16×16 pixels, and the image is encoded on the block-by-block basis. In the inter-frame encoding method, a prediction signal is produced by carrying out motion compensating prediction on a target block of an encoding target image with reference to other frames that have been encoded and restored. Then, a differential value of the target block and the prediction signal is obtained. The differential value is discrete-cosine-transformed and quantized so as to produce encoded data.

Besides the inter-frame encoding method, a bidirectional prediction method is used to reduce quantized noises included in prediction signals and predict a newly appearing image signal. In the bidirectional prediction method, two pieces of motion amount are set to a target block. First motion amount determines a first prediction signal from a first reference image that is a temporally past image relative to the target block, while second motion amount determines a second prediction signal from a second reference image that is a temporally future image relative to the target block. The first and second prediction signals are averaged to produce a prediction signal. Alternatively, the first and second prediction signals may be obtained from two respective reference images that are temporally past images, and averaged to produce a prediction signal.

SUMMARY OF INVENTION

Moving pictures may include some images in which textures (pictures) change over time. In such texture signal, pixels at the same location between frames change over time because each pixel shows minute movements. Sea tides, smoke, and flowerbeds that catch breeze are exemplified as the textures. Such texture is called a "dynamic texture". An assumption can be made that pixels in a target block serving as an encoding target are rarely different from those in the front and back frames relative to the target block. Accordingly, if the assumption is true that a motion compensated prediction signal is similar to a target signal, the differential signal can be made small. In other words, data compression is achieved by utilizing a characteristic that signals between frames have high correlation.

However, when a signal of a target block includes dynamic textures, the differential signal becomes large because a pixel of the target block is not similar to the pixel in the prediction signal at the same location as that of the target block due to changes in the pixel value over time, even though prediction is carried out from the front and the back frames. Consequently, the amount of compressed data may increase in the differential signal. Specifically, moving pictures including dynamic textures can show low correlation between frames. Accordingly, a high compression rate of the differential signal is rarely achieved. Particularly, when encoding is carried out at a low bit rate, a differential signal having a large data amount is not often transmitted. A problem, may thus arise in which texture signals in reproduction images may be partially lost.

The presently described embodiments aim to provide a moving picture encoding device, a moving picture decoding device, a moving picture encoding method, a moving picture decoding method, a moving picture encoding program, and a moving picture decoding program that can reduce the data amount of compressed moving pictures by producing prediction signals suitable for moving pictures that include dynamic textures.

An example moving picture encoding device may include: an input section receiving a target signal included in an encoding target image of a moving picture composed of a plurality of images; a prediction signal generation section producing a prediction signal with respect to the target signal; a difference generation section producing a differential signal indicating a difference between the target signal and the prediction signal; an encoding section encoding the differential signal by a certain method so as to produce an encoded differential signal; a decoding section decoding the encoded differential signal so as to produce a decoded differential signal; an adding section adding the prediction signal to the decoded differential signal so as to produce a reproduction signal; a storage section storing the reproduction signal as a reference image referred to in producing the prediction signal; and a reference image generation section obtaining an observation matrix by using a pre-existing reference image that is the reference image having been already produced and stored in the storage section, producing, based on the observation matrix, a new reference image newly serving as the reference image, and storing the new reference image in the storage section. The prediction signal generation section produces the prediction signal by using at least the new reference image.

An example method of moving picture encoding may include: receiving a target signal included in an encoding target image of a moving picture composed of a plurality of images by an input section; producing a prediction signal with respect to the target signal by a prediction signal generation section; producing a differential signal indicating a difference between the target signal and the prediction signal by a difference generation section; encoding the differential signal by a certain method so as to produce an encoded differential signal by an encoding section; decoding the encoded differential signal so as to produce a decoded differential signal by a decoding section; adding the prediction signal to the decoded differential signal so as to produce a reproduction signal by an adding section; storing the reproduction signal by a storage section as a reference image referred to in producing the prediction signal; and obtaining an observation matrix by using a pre-existing reference image that is the reference image having been already produced and stored in the storage section, producing, based on the observation matrix, a new reference image newly serving as the reference image, and storing the new reference image in the storage section by a reference image generation section. In the producing of the prediction signal, the prediction signal is produced by using at least the new reference image.

An example moving picture encoding program may cause a computer to execute: an input section receiving a target signal included in an encoding target image of a moving picture composed of a plurality of images; a prediction signal generation section producing a prediction signal with respect to the target signal; a difference generation section producing a differential signal indicating a difference between the target signal and the prediction signal; an encoding section encoding the differential signal by a certain method so as to produce an encoded differential signal; a decoding section decoding the encoded differential signal so as to produce a decoded differential signal; an adding section adding the prediction signal to the decoded differential signal so as to produce a reproduction signal; a storage section storing the reproduction signal as a reference image referred to in producing the prediction signal; and a reference image generation section obtaining an observation matrix by using a pre-existing reference image that is the reference image having been already produced and stored in the storage section, producing, based on the observation matrix, a new reference image newly serving as the reference image, and storing the new reference image in the storage section. The prediction signal generation section produces the prediction signal by using at least the new reference image.

During example operation of the moving picture encoding and decoding system, a target signal of an encoding target image that is a partial image of moving pictures is input, a differential signal indicating a difference between the target signal and a prediction signal is encoded, the resultant encoded differential signal is decoded, the prediction signal is added to the decoded differential signal so as to produce a reproduction signal, and the reproduction signal is stored as a reference image for producing the prediction signal. In the processes, an observation matrix is obtained by using a pre-existing reference image having been already produced, a new reference image is produced based on the observation matrix, and the prediction signal is produced by using at least the new reference image. Thus, a reference image suitable for a characteristic of a dynamic texture and not included in the pre-existing reference image can be newly produced. This enables a prediction signal more similar to a dynamic texture in an encoding target image to be produced, resulting in a differential signal being made small. Consequently, the data amount of a compressed moving picture can be effectively reduced.

The reference image generation section may obtain the observation matrix and a state vector based on the pre-existing reference image and produce the new reference image based on the observation matrix and the state vector. The new reference image may be produced when the reference image generation section can produce a prediction signal more similar to a dynamic texture in an encoding target image.

The encoding section may further encode the state vector. In this case, a decoding side may not need to carry out a process for producing the state vector by providing the state vector to the decoding side, resulting in an efficient decoding process being realized.

The reference image generation section may obtain the observation matrix by carrying out singular value decomposition on a matrix composed of a plurality of such pre-existing reference images. With this structure, a prediction signal more similar to a dynamic texture in an encoding target image can be produced.

Another example within the moving picture encoding and decoding system of a moving picture decoding device includes: an input section receiving compressed data including an encoded differential signal obtained by prediction encoding a moving picture; a decoding section decoding the encoded differential signal so as to produce a decoded differential signal; a prediction signal generation section producing a prediction signal with respect to the decoded differential signal; an adding section adding the prediction signal to the decoded differential signal so as to produce a reproduction signal; a storage section storing the reproduction signal as a reference image referred to in producing the prediction signal; and a reference image generation section obtaining an observation matrix by using a pre-existing reference image that is the reference image having been already produced and stored in the storage section, producing, based on the observation matrix, a new reference image newly serving as the reference image, and storing the new reference image in the storage section. The prediction signal generation section produces the prediction signal by using at least the new reference image.

In another example, a moving picture decoding device includes: an input section receiving compressed data including an encoded differential signal obtained by prediction encoding a moving picture; a decoding section decoding the encoded differential signal so as to produce a decoded differential signal; a prediction signal generation section producing a prediction signal with respect to the decoded differential signal; an adding section adding the prediction signal to the decoded differential signal so as to produce a reproduction signal; and a storage section storing the reproduction signal as a reference image referred to in producing the prediction signal. The prediction signal generation section obtains at least one of an observation matrix and a state vector by using a pre-existing reference image that is the reference image having been produced and stored in the storage section, and produces the prediction signal based on the observation matrix or the state vector.

An example moving picture decoding method of the moving picture encoding and decoding system includes: receiving compressed data including an encoded differential signal obtained by prediction encoding a moving picture by an input section; decoding the encoded differential signal so as to produce a decoded differential signal by a decoding section; producing a prediction signal with respect to the decoded differential signal by a prediction signal generation section; adding the prediction signal to the decoded differential signal so as to produce a reproduction signal by an adding section; storing the reproduction signal by a storage section as a reference image referred to in producing the prediction signal; and obtaining an observation matrix by using a pre-existing reference image that is the reference image having been already produced and stored in the storage section, producing, based on the observation matrix, a new reference image newly serving as the reference image, and storing the new reference image in the storage section by a reference image generation section. In the producing of the prediction signal, the prediction signal is produced by using at least the new reference image.

Another example moving picture decoding method of the moving picture encoding and decoding system includes: receiving compressed data including an encoded differential signal obtained by prediction encoding a moving picture by an input section; decoding the encoded differential signal so as to produce a decoded differential signal by a decoding section; producing a prediction signal with respect to the decoded differential signal by a prediction signal generation section; adding the prediction signal to the decoded differential signal so as to produce a reproduction signal by an adding section; and storing the reproduction signal by a storage section as a reference image referred to in producing the prediction signal. In the producing of the prediction signal, at least one of an observation matrix and a state vector is obtained by using a pre-existing reference image that is the reference image having been produced and stored in the storage section, and the prediction signal is produced based on the observation matrix or the state vector.

An example moving picture decoding program that may be included as part of the moving picture encoding and decoding system may cause a computer to operate as: an input section receiving compressed data including an encoded differential signal obtained by prediction encoding a moving picture; a decoding section decoding the encoded differential signal so as to produce a decoded differential signal; a prediction signal generation section producing a prediction signal with respect to the decoded differential signal; an adding section adding the prediction signal to the decoded differential signal so as to produce a reproduction signal; a storage section storing the reproduction signal as a reference image referred to in producing the prediction signal; and a reference image generation section obtaining an observation matrix by using a pre-existing reference image that is the reference image having been already produced and stored in the storage section, producing, based on the observation matrix, a new reference image newly serving as the reference image, and storing the new reference image in the storage section. The prediction signal generation section produces the prediction signal by using at least the new reference image.

An example of a moving picture decoding program of the moving picture encoding and decoding system causes a computer to operate as: an input section receiving compressed data including an encoded differential signal obtained by prediction encoding a moving picture; a decoding section decoding the encoded differential signal so as to produce a decoded differential signal; a prediction signal generation section producing a prediction signal with respect to the decoded differential signal; an adding section adding the prediction signal to the decoded differential signal so as to produce a reproduction signal; and a storage section storing the reproduction signal as a reference image referred to in producing the prediction signal. The prediction signal generation section obtains at least one of an observation matrix and a state vector by using a pre-existing reference image that is the reference image having been produced and stored in the storage section, and produces the prediction signal based on the observation matrix or the state vector.

During example operation of the moving picture encoding and decoding system, compressed data including an encoded differential signal is input, the encoded differential signal is decoded, a prediction signal is added to the decoded differential signal so as to produce a reproduction signal, and the reproduction signal is stored as a reference image for producing the prediction signal. In the processes, an observation matrix or a state vector is obtained by using a pre-existing reference image having been already produced, and the prediction signal is produced based on the observation matrix or the state vector. Thus, a prediction signal can be produced that is more suitable for the characteristic of a dynamic texture than a prediction signal produced by using only the pre-existing reference image. This makes a differential signal small. As a result, the data amount of compressed data can be effectively reduced.

The reference image generation section can obtain the observation matrix and a state vector based on the pre-existing reference image and produce the new reference image based on the observation matrix and the state vector. The new reference image may be produced when the reference image generation section can produce a prediction signal more similar to a dynamic texture in an encoding target image.

The compressed data may further include vector compressed data corresponding to a state vector, the decoding section may restore the vector compressed data so as to produce a decoded state vector, and the reference image generation section may produce the new reference image based on the observation matrix and the decoded state vector. Accordingly, a process for producing the state vector may not be needed by being provided the state vector from an encoding side, resulting in an efficient decoding process being realized.

The reference image generation section may obtain the observation matrix by carrying out singular value decomposition on a matrix composed of a plurality of such pre-existing reference images. In this case, a prediction signal can be produced that is more similar to a dynamic texture in an encoding target image.

An example moving picture encoding device included in the moving picture encoding and decoding system includes: an input section receiving a target signal included in an encoding target image of a moving picture composed of a plurality of images; a dividing section dividing the encoding target image into a plurality of regions; a prediction signal generation section producing a prediction signal with respect to a target signal of a target region in the plurality of regions; a difference generation section producing a differential signal indicating a difference between the target signal of the target region and the prediction signal; an encoding section encoding the differential signal by a certain method so as to produce an encoded differential signal; a decoding section decoding the encoded differential signal so as to produce a decoded differential signal; an adding section adding the prediction signal to the decoded differential signal so as to produce a reproduction signal of the target region; a storage section storing the reproduction signal as a reference image referred to in producing the prediction signal; a reference image generation section obtaining an observation matrix by using a pre-existing reference image that is the reference image having been already produced and stored in the storage section, producing, based on the observation matrix, a new reference image newly serving as the reference image, and storing the new reference image in the storage section; a position setting section setting an insertion position of the new reference image in a reference image list controlling a plurality of such reference images; and an entropy encoding section entropy-encoding at least the encoded differential signal and positional information specifying the insertion position of the new reference image. The prediction signal generation section updates the reference image list based on the positional information specifying the insertion position of the new reference image and produces the prediction signal of the target region by using the reference image selected from the plurality of reference images included in the reference image list. The entropy encoding section encodes a reference image number specifying the reference image used for producing the prediction signal of the target region.

Another example moving picture encoding device of the moving picture encoding and decoding system includes: an input section receiving a target signal included in an encoding target image of a moving picture composed of a plurality of images; a dividing section dividing the encoding target image into a plurality of regions; a prediction signal generation section producing a prediction signal with respect to a target signal of a target region in the plurality of regions; a difference generation section producing a differential signal indicating a difference between the target signal of the target region and the prediction signal; an encoding section encoding the differential signal by a certain method so as to produce an encoded differential signal; a decoding section decoding the encoded differential signal so as to produce a decoded differential signal; an adding section adding the prediction signal to the decoded differential signal so as to produce a reproduction signal of the target region; a storage section storing the reproduction signal as a reference image referred to in producing the prediction signal; a reference image generation section obtaining an observation matrix by using a pre-existing reference image that is the reference image having been already produced and stored in the storage section, producing, based on the observation matrix, a new reference image newly serving as the reference image, and stores the new reference image in the storage section; a position setting section setting an insertion position of the new reference image in a reference image list controlling a plurality of such reference images relating to a large region composed of at least two such target regions; and an entropy encoding section entropy-encoding at least the encoded differential signal and positional information specifying the insertion position of the new reference image relating to the large region. The prediction signal generation section updates the reference image list relating to the large region based on the positional information specifying the insertion position of the new reference image and produces the prediction signal of the target region by using the reference image selected from the plurality of reference images included in the reference image list relating to the large region to which the target region belongs. The entropy encoding section encodes a reference image number specifying the reference image used for producing the prediction signal of the target region.

An example of a moving picture encoding method of the moving picture encoding and decoding system includes: receiving a target signal included in an encoding target image of a moving picture composed of a plurality of images by an input section; dividing the encoding target image into a plurality of regions by a dividing section; producing a prediction signal with respect to a target signal of a target region in the plurality of regions by a prediction signal generation section; producing a differential signal indicating a difference between the target signal of the target region and the prediction signal by a difference generation section; encoding the differential signal by a certain method so as to produce an encoded differential signal by an encoding section; decoding the encoded differential signal so as to produce a decoded differential signal by a decoding section; adding the prediction signal to the decoded differential signal so as to produce a reproduction signal of the target region by an adding section; storing the reproduction signal by a storage section as a reference image referred to in producing the prediction signal; obtaining an observation matrix by using a pre-existing reference image that is the reference image having been already produced and stored in the storage section, producing, based on the observation matrix, a new reference image newly serving as the reference image, and storing the new reference image in the storage section by a reference image generation section; setting an insertion position of the new reference image in a reference image list controlling a plurality of such reference images by a position setting section; and entropy-encoding at least the encoded differential signal and positional information specifying the insertion position of the new reference image by an entropy encoding section. In the producing of the prediction signal, the reference image list is updated based on the positional information specifying the insertion position of the new reference image, and the prediction signal of the target region is produced by using the reference image selected from the plurality of reference images included in the reference image list. In the entropy-encoding, a reference image number specifying the reference image used for producing the prediction signal of the target region is encoded.

Another example of a moving picture encoding method of the moving picture encoding and decoding system includes: receiving a target signal included in an encoding target image of a moving picture composed of a plurality of images by an input section; dividing the encoding target image into a plurality of regions by a dividing section; producing a prediction signal with respect to a target signal of a target region in the plurality of regions by a prediction signal generation section; producing a differential signal indicating a difference between the target signal of the target region and the prediction signal by a difference generation section; encoding the differential signal by a certain method so as to produce an encoded differential signal by an encoding section; decoding the encoded differential signal so as to produce a decoded differential signal by a decoding section; adding the prediction signal to the decoded differential signal so as to produce a reproduction signal of the target region by an adding section; storing the reproduction signal by a storage section as a reference image referred to in producing the prediction signal; obtaining an observation matrix by using a pre-existing reference image that is the reference image having been already produced and stored in the storage section, producing, based on the observation matrix, a new reference image newly serving as the reference image, and storing the new reference image in the storage section by a reference image generation section; setting an insertion position of the new reference image in a reference image list controlling a plurality of such reference images relating to a large region composed of at least two such target regions by a position setting section; and entropy-encoding at least the encoded differential signal and positional information specifying the insertion position of the new reference image relating to the large region by an entropy encoding section. In the producing of the prediction signal, the reference image list relating to the large region is updated based on the positional information specifying the insertion position of the new reference image, and the prediction signal of the target region is produced by using the reference image selected from the plurality of reference images included in the reference image list relating to the large region to which the target region belongs. In the entropy-encoding, a reference image number specifying the reference image used for producing the prediction signal of the target region is encoded.

The moving picture encoding and decoding system may cause a computer to execute a process performed by any of the moving picture encoding devices, a reference image suitable for a characteristic of a dynamic texture and not included in the pre-existing reference image can be newly produced, since a new reference image is produced based on an observation matrix. This makes it possible to produce a prediction signal more similar to a dynamic texture in an encoding target image. As a result, the data amount of a moving picture compressed by making the differential signal small can be effectively reduced. In other words, a dynamic texture can be efficiently encoded. Additionally, the moving picture encoding devices etc. described above use a reference image list controlling the new reference image and pre-existing reference image and produce a prediction signal by using a reference image selected from reference images included in the reference image list. This enables a prediction signal more similar to a dynamic texture in an encoding target image to be produced. As a result, this enables the differential signal smaller, and a signal visually similar to a target signal to be reproduced without encoding the differential signal. Furthermore, the moving picture encoding devices etc. also encode the insertion position of the new reference image in the reference image list, thereby reducing the code quantity needed for selecting information of the reference image.

The position setting section may produce the positional information showing that the new reference image is not included in the reference image list when the new reference image is not included in the reference image list, the entropy encoding section may entropy-encode the positional information showing that the new reference image is not included in the reference image list, and the prediction signal generation section may update the reference image list in such a manner that the reference image list does not include the new reference image. Additionally, in the setting of the position of the new reference image, the positional information showing that the new reference image is not included in the reference image list may be produced when the new reference image is not included in the reference image list, in the entropy-encoding, the positional information showing that the new reference image is not included in the reference image list may be entropy-encoded, and in the producing of the prediction signal, the reference image list may be updated in such a manner that the reference image list does not include the new reference image. The reference image list may be updated when the position setting section or the setting of the position can widen the options of making up a reference image list and selecting a reference image and thus increase a degree of freedom.

The reference image generation section may obtain the observation matrix and a state vector based on the pre-existing reference image and produce the new reference image based on the observation matrix and the state vector. The new reference image may be produced when the reference image generation section can produce a prediction signal more similar to a dynamic texture in an encoding target image.

It The entropy encoding section may further entropy-encode the state vector. In this case, the decoding side does not need to carry out a process for producing the state vector by providing the state vector to the decoding side, resulting in an efficient decoding process being realized.

The reference image generation section may obtain at least one of the observation matrix and the state vector by carrying out singular value decomposition on a matrix composed of a plurality of such pre-existing reference images so as to produce the new reference image. With the structure, a prediction signal more similar to a dynamic texture in an encoding target image can be produced.

An example of a moving picture decoding device of the moving picture encoding and decoding system includes: an input section receiving compressed data including an encoded differential signal obtained by prediction encoding a moving picture; an entropy decoding section restoring at least the encoded differential signal of a target region serving as a decoding target from the compressed data; a decoding section decoding the encoded differential signal of the target region so as to produce a decoded differential signal; a prediction signal generation section producing a prediction signal of the target region with respect to the decoded differential signal; an adding section adding the prediction signal to the decoded differential signal so as to produce a reproduction signal of the target region; a storage section storing the reproduction signal of the target region as a reference image referred to in producing the prediction signal; and a reference image generation section obtaining an observation matrix by using a pre-existing reference image that is the reference image having been already produced and stored in the storage section, producing, based on the observation matrix, a new reference image newly serving as the reference image, and storing the new reference image in the storage section. The entropy decoding section decodes from the compressed data positional information specifying an insertion position of the new reference image in a reference image list controlling a plurality of such reference images. The prediction signal generation section updates the reference image list based on the positional information specifying the insertion position of the new reference image. The entropy decoding section decodes from the compressed data a reference image number specifying the reference image used in producing the prediction signal of the target region based on the updated reference image list. The prediction signal generation section produces the prediction signal of the target region by using the reference image specified by the decoded reference image number.

An example of a moving picture decoding device of the moving picture encoding and decoding system includes: an input section receiving compressed data including an encoded differential signal obtained by prediction encoding a moving picture; an entropy decoding section restoring at least the encoded differential signal of a target region serving as a decoding target from the compressed data; a decoding section decoding the encoded differential signal of the target region so as to produce a decoded differential signal; a prediction signal generation section producing a prediction signal of the target region with respect to the decoded differential signal; an adding section adding the prediction signal to the decoded differential signal so as to produce a reproduction signal of the target region; a storage section storing the reproduction signal of the target region as a reference image referred to in producing the prediction signal; and a reference image generation section obtaining an observation matrix by using a pre-existing reference image that is the reference image having been already produced and stored in the storage section, producing, based on the observation matrix, a new reference image newly serving as the reference image, and storing the new reference image in the storage section. The entropy decoding section decodes from the compressed data positional information specifying an insertion position of the new reference image in a reference image list controlling a plurality of such reference images relating to a large region composed of at least two such target regions. The prediction signal generation section updates the reference image list relating to the large region based on the positional information specifying the insertion position of the new reference image. The entropy decoding section decodes from the compressed data a reference image number specifying the reference image used in producing the prediction signal of the target region based on the updated reference image list. The prediction signal generation section produces the prediction signal of the target region by using the reference image specified by the decoded reference image number.

An example moving picture decoding device of the moving picture encoding and decoding system includes: an input section receiving compressed data including an encoded differential signal obtained by prediction encoding a moving picture; an entropy decoding section restoring at least the encoded differential signal of a target region serving as a decoding target from the compressed data; a decoding section decoding the encoded differential signal of the target region so as to produce a decoded differential signal; a prediction signal generation section producing a prediction signal of the target region with respect to the decoded differential signal; an adding section adding the prediction signal to the decoded differential signal so as to produce a reproduction signal of the target region; and a storage section storing the reproduction signal of the target region as a reference image referred to in producing the prediction signal. The entropy decoding section decodes from the compressed data positional information specifying an insertion position of the new reference image in a reference image list controlling a plurality of such reference images. The prediction signal generation section updates the reference image list based on the positional information specifying the insertion position of the new reference image, obtains an observation matrix by using a pre-existing image that is the reference image having been already produced and stored in the storage section, produces a new reference image newly serving as the reference image based on the observation matrix, and stores the new reference image in the storage section. The entropy decoding section decodes from the compressed data a reference image number specifying the reference image used in producing the prediction signal of the target region based on the updated reference image list. The prediction signal generation section produces the prediction signal of the target region by using the reference image specified by the decoded reference image number.

An example moving picture decoding method of the moving picture encoding and decoding system includes: receiving compressed data including an encoded differential signal obtained by prediction encoding a moving picture by an input section; restoring at least the encoded differential signal of a target region serving as a decoding target from the compressed data by an entropy decoding section; decoding the encoded differential signal of the target region so as to produce a decoded differential signal by a decoding section; producing a prediction signal of the target region with respect to the decoded differential signal by a prediction signal generation section; adding the prediction signal to the decoded differential signal so as to produce a reproduction signal of the target region by an adding section; storing the reproduction signal of the target region by a storage section as a reference image referred to in producing the prediction signal; and obtaining an observation matrix by using a pre-existing reference image that is the reference image having been already produced and stored in the storage section, producing, based on the observation matrix, a new reference image newly serving as the reference image, and storing the new reference image in the storage section by a reference image generation section. In the restoring, positional information specifying an insertion position of the new reference image in a reference image list controlling a plurality of such reference images is decoded from the compressed data. In the producing of the prediction signal, the reference image list is updated based on the positional information specifying the insertion position of the new reference image. In the restoring, a reference image number specifying the reference image used in producing the prediction signal of the target region based on the updated reference image list is decoded from the compressed data. In the producing of the prediction signal, the prediction signal of the target region is produced by using the reference image specified by the decoded reference image number.

Another example moving picture decoding method of the moving picture encoding and decoding system includes: receiving compressed data including an encoded differential signal obtained by prediction encoding a moving picture by an input section; restoring at least the encoded differential signal of a target region serving as a decoding target from the compressed data by an entropy decoding section; decoding the encoded differential signal of the target region so as to produce a decoded differential signal by a decoding section; producing a prediction signal of the target region with respect to the decoded differential signal by a prediction signal generation section; adding the prediction signal to the decoded differential signal so as to produce a reproduction signal of the target region by an adding section; storing the reproduction signal of the target region by a storage section as a reference image referred to in producing the prediction signal; and obtaining an observation matrix by using a pre-existing reference image that is the reference image having been already produced and stored in the storing, producing, based on the observation matrix, a new reference image newly serving as the reference image, and storing the new reference image in the storing by a reference image generation section. In the restoring, positional information specifying an insertion position of the new reference image in a reference image list controlling a plurality of such reference images relating to a large region composed of at least two such target regions is decoded from the compressed data. In the producing of the prediction signal, the reference image list relating to the large region is updated based on the positional information specifying the insertion position of the new reference image. In the restoring, a reference image number specifying the reference image used in producing the prediction signal of the target region based on the updated reference image list is decoded from the compressed data. In the producing of the prediction signal, the prediction signal of the target region is produced by using the reference image specified by the decoded reference image number.

Another example moving picture decoding method of the moving picture encoding and decoding system includes: receiving compressed data including an encoded differential signal obtained by prediction encoding a moving picture by an input section; restoring at least the encoded differential signal of a target region serving as a decoding target from the compressed data by an entropy decoding section; decoding the encoded differential signal of the target region so as to produce a decoded differential signal by a decoding section; producing a prediction signal of the target region with respect to the decoded differential signal by a prediction signal generation section; adding the prediction signal to the decoded differential signal so as to produce a reproduction signal of the target region by an adding section; and storing the reproduction signal of the target region by a storage section as a reference image referred to in producing the prediction signal. In the restoring, positional information specifying an insertion position of the new reference image in a reference image list controlling a plurality of such reference images is decoded from the compressed data. In the producing of the prediction signal, the reference image list is updated based on the positional information specifying the insertion position of the new reference image, an observation matrix is obtained by using a pre-existing image that is the reference image having been already produced and stored in the storage section, a new reference image newly serving as the reference image is produced based on the observation matrix, and the new reference image is stored in the storage section. In the restoring, a reference image number specifying the reference image used in producing the prediction signal of the target region based on the updated reference image list is decoded from the compressed data. In the producing of the prediction signal, the prediction signal of the target region is produced by using the reference image specified by the decoded reference image number.

The moving picture encoding and decoding system may cause a computer to execute a process performed by any of the moving picture decoding devices, a reference image suitable for the characteristic of a dynamic texture and not included in the pre-existing reference image can be newly produced, since a new reference image is produced based on an observation matrix. This makes it possible to produce a prediction signal more similar to a dynamic texture. As a result, the data amount of a moving picture compressed by making a differential signal small can be effectively reduced. Additionally, the moving picture decoding devices etc. described above use a reference image list controlling the new reference image and pre-existing reference image and produce a prediction signal by using a reference image selected from reference images included in the reference image list. This enables a prediction signal more similar to a dynamic texture to be produced, and a differential signal to be further made small. Furthermore, the moving picture decoding devices etc. also obtain an insertion position of a new reference image in a reference image list by decoding the compressed data, thereby reducing the code quantity needed for selecting information of the reference image.

The entropy decoding section may decode the positional information showing that the new reference image is not included in the reference image list, and the prediction signal generation section may update the reference image list in such a manner that the reference image list does not include the new reference image. In the restoring, the positional information showing that the new reference image is not included in the reference image list may be decoded, and in the producing of the prediction signal, the reference image list may be updated in such a manner that the reference image list does not include the new reference image. The reference image list may be updated when the entropy decoding section or the restoring can widen the options of making up a reference image list and selecting a reference image and thus increase a degree of freedom.

The reference image generation section may obtain the observation matrix and a state vector based on the pre-existing reference image and produce the new reference image based on the observation matrix and the state vector. The new reference image may be produced when the reference image generation section can produce a prediction signal more similar to a dynamic texture in an encoding target image.

The compressed data may further include vector compressed data corresponding to a state vector, the decoding section may restore the vector compressed data so as to produce a decoded state vector in decoding the encoded differential signal to the decoded differential signal, and the reference image generation section may produce the new reference image based on the observation matrix and the decoded state vector. Accordingly, a process for producing the state vector may not be needed by being provided the state vector from the encoding side, resulting in an efficient decoding process being realized.

The reference image generation section may obtain at least one of the observation matrix and the state vector by carrying out singular value decomposition on a matrix composed of a plurality of such pre-existing reference images so as to produce the new reference image. In this case, a prediction signal can be produced that is more similar to a dynamic texture in an encoding target image.

According to operation of the moving picture encoding and decoding system, a prediction signal suitable for a moving picture including a dynamic texture may be produced, whereby the data amount of a compressed moving picture can be reduced.

BRIEF DESCRIPTION OF DRAWINGS

FIG. 14 shows an example of a reference image list.

FIG. 15 shows an example of another reference image list.

FIG. 16 shows an example of still another reference image list.

DESCRIPTION OF EMBODIMENTS

Figure 1:
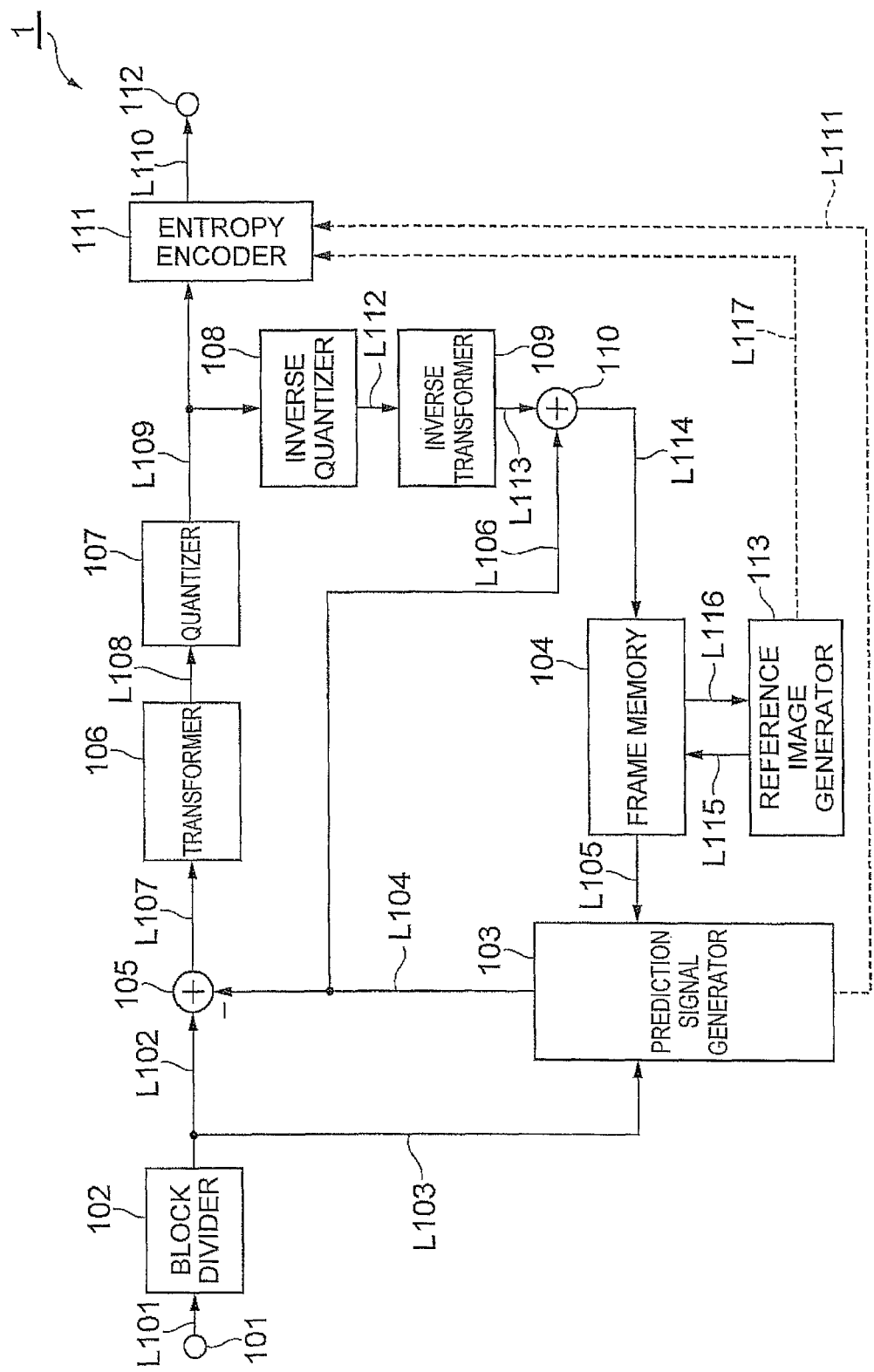
FIG. 1 is a block diagram showing an example structure of a moving picture encoding device according to a first embodiment of the present invention.

Preferred embodiments of a moving picture encoding and decoding system are described in detail below with reference to the accompanying drawings. In the descriptions, elements that are the same or have the same functions are labeled with the same reference numerals, and the duplicated description thereof is omitted.

First Embodiment (Moving picture encoding device) FIG. 1 is a block diagram showing a structure of an example moving picture encoder or encoding device included in the moving picture encoding and decoding system. The moving picture encoding device may be a computing device or computer, including for example software, hardware, or a combination of hardware and software, as described later, capable of performing the described functionality. The moving picture encoding device may be one or more separate systems or devices included in the moving picture encoding and decoding system, or may be combined with other systems or devices within the moving picture encoding and decoding system. In other examples, fewer or additional blocks may be used to illustrate the functionality of the moving picture encoding device. A moving picture encoder, or encoding device 1 shown in the diagram is provided with an input terminal (an input section) 101, a block divider 102, a prediction signal generator (a prediction signal generation section) 103, a frame memory (a storage section) 104, a subtractor (a difference generation section) 105, a transformer (an encoding section) 106, a quantizer (an encoding section) 107, an inverse quantizer (a decoding section) 108, an inverse transformer (a decoding section) 109, an adder (an adding section) 110, an entropy encoder 111, an output terminal 112, and a reference image generator (a reference image generation section) 113. Example operation of each element of the moving picture encoding device 1 is described below. The term "section" may be defined to include one or more executable modules. As described herein, the sections are defined to include software, hardware or some combination thereof executable by a processor. Software modules may include instructions stored in the frame memory 104, or other memory device, that are executable by the processor or other processor. Hardware modules may include various devices, components, circuits, gates, circuit boards, and the like that are executable, directed, and/or controlled for performance by the processor.

The block divider 102 receives a moving picture signal composed of images of a plurality of frames from the input terminal 101, and divides an encoding target image serving as an encoding target in the moving picture signal into a plurality of regions. Specifically, the block divider 102 divides an image into a block (region) composed of, for example, 16×16 pixels. The block divider 102, however, may divide an image into a block composed of 8×8 pixels or a block having any size and shape (e.g., a non-square shape) besides the blocks described above. The block divider 102 outputs a pixel signal of an encoding processing target region out of pixel signals of the divided blocks to the subtractor 105 through a line L102 and to the prediction signal generator 103 through a line L103. The encoding processing target region is referred to as a "target block" while the pixel signal thereof is referred to as a "target pixel signal" hereinafter.

The prediction signal generator 103 produces, with respect to the target pixel signal of the target block, a prediction signal that is composed of, for example, 16×16 pixels and that predicts the image of the target block. In other words, the prediction signal generator 103 detects the motion amount of the target block based on a reference image stored in the frame memory 104 and calculates the prediction signal based on an obtained motion vector (motion amount) and the reference image, for example, by using a method specified in the existing standards, such as MPEG-2, 4, and H.264 or newly developed standards. The reference image is a reproduction image that is restored after being encoded in the past processing (details are described later). In the embodiment, the prediction signal generator 103 detects the motion amount to produce a prediction signal based on a target pixel signal of a target block input through the line L103 and a reference image referred from the frame memory 104 through a line L105, and sends the prediction signal to the subtractor 105 through a line L104 and to the adder 110 through a line L106.

The subtractor 105 subtracts, from the target pixel signal sent from the block divider 102, the prediction signal with respect to the target pixel signal, the prediction signal being sent from the prediction signal generator 103, to produce a differential signal indicating a difference between the two signals. The differential signal is output to the transformer 106 through a line L107, and transformed into an encoded differential signal by the transformer 106 and the quantizer 107 by a certain encoding method. Specifically, the transformer 106 discrete-cosine-transforms the differential signal into a transform coefficient. The transform coefficient is output to the quantizer 107 through a line L108. The quantizer 107 quantizes the transform coefficient to produce the encoded differential signal, and thereafter outputs the encoded differential signal to the entropy encoder 111 and the inverse quantizer 108 through a line L109.

The entropy encoder 111 transforms the encoded differential signal into a variable length code, and thereafter outputs the variable length code to the output terminal 112 through a line L110. The entropy encoder 111 may carry out arithmetic encoding instead of transforming the encoded differential signal into the variable length code. At the same time, the motion vector that is of the target block and obtained by the prediction signal generator 103 is sent to the entropy encoder 111 through a line L111. The entropy encoder 111 transforms the motion vector into a variable length code, and outputs the variable length code to the output terminal 112.

The inverse quantizer 108 and the inverse transformer 109 reproduce a decoded differential signal from the encoded differential signal by a decoding method corresponding to the encoding method carried out by the transformer 106 and the quantizer 107. Specifically, the inverse quantizer 108 inverse-quantizes the quantized transform coefficient to restore the quantized transform coefficient to the transform coefficient, and outputs the transform coefficient to the inverse transformer 109 through a line L112. The inverse transformer 109 restores the transform coefficient to the differential signal by carrying out an inverse-discrete-cosine transform process. The inverse transformer 109 sends the decoded differential signal to the adder 110 through a line L113.

The adder 110 adds the prediction signal input through the line L106 to the decoded differential signal to reproduce the target pixel signal of the target block as a reproduction signal, and stores the reproduction signal in the frame memory 104 through a line L114. The frame memory 104 retains a plurality of target pixel signals processed as the target blocks in the past processes (hereinafter, referred to as a "pre-existing reference image"). The pre-existing reference images are referred when a prediction signal of a subsequent target block is produced.

The reference image generator 113 produces a new reference image different from the pre-existing reference images already stored in the frame memory 104. For this process, the reference image generator 113 acquires, through a line L116, the pre-existing images stored in the frame memory 104.

Figure 2:
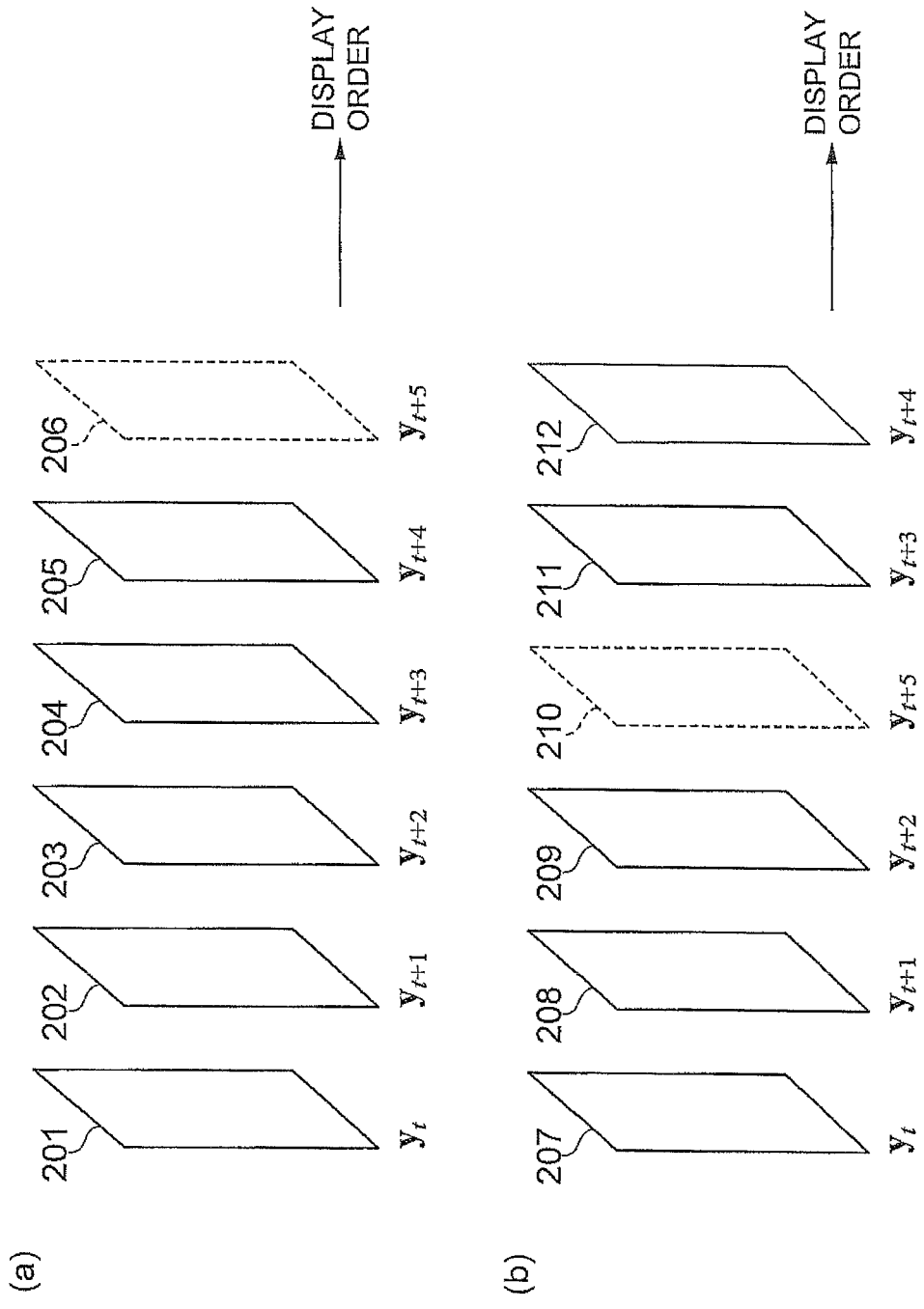
FIG. 2 schematically shows an example of pre-existing reference images stored in a frame memory in FIG. 1.

FIG. 2 schematically shows an example of the pre-existing reference images stored in the frame memory 104. FIG. 2(a) shows the pre-existing reference images when frames are encoded in accordance with display order of moving picture signals. The reproduction images of frames 201, 202, 203, 204, and 205 are stored as pixel vectors $y_t$, $y_{t+1}$, $y_{t+2}$, $y_{t+3}$, and $y_{t+4}$ (the indexes show time). In this case, encoding processing is carried out in the order from the frame 201 to the frame 205. At the time when the frame 206 is processed as a target frame, the frame memory 104 stores the reproduction images of the frames 201 to 205 as the pre-existing reference images. FIG. 2(b) shows the pre-existing reference images when bidirectional prediction is carried out in detecting the motion amount. In this case, a frame 210 is encoded after encoding frames 207 to 209, 211 and 212. At the time when the frame 210 is processed as a target frame, the frame memory 104 stores the reproduction images of the frames 207 to 209, 211 and 212 as the pre-existing reference images.

The reference image generator 113 produces a new reference image by using a part of the pre-existing reference images stored in the frame memory 104 as described above. For example, the reference image generator 113 forms a matrix $Y_t^{t+4}$ composed of the pixel vectors $y_t$, $y_{t+1}$, $y_{t+2}$, $y_{t+3}$, and $y_{t+4}$ from the pixel vectors $y_t$, $y_{t+1}$, $y_{t+2}$, $y_{t+3}$, and $y_{t+4}$ of a pre-existing number, such as five, pre-existing reference images in the frame memory 104 by using the following formula (1).

[Formula 1]

$$Y_t^{t+4} = [y_t y_{t+1} y_{t+2} y_{t+3} y_{t+4}] \quad (1)$$

The reference image generator 113 carries out a singular value decomposition process on the matrix $Y_t^{t+4}$ composed of the pre-existing reference images. As for the singular value decomposition process, QR decomposition represented by the following formula (2) can be employed.

[Formula 2]

$$Y_t^{t+4} = CX_t^{t+4} \quad (2)$$

A matrix $X_t^{t+4}$ in formula (2) is expressed by the following formula (3).

[Formula 3]

$$X_t^{t+4} = [x_t x_{t+1} x_{t+2} x_{t+3} x_{t+4}] \quad (3)$$

In this way, the reference image generator 113 obtains an observation matrix C and vectors $x_t$, $x_{t+1}$, $x_{t+2}$, $x_{t+3}$, and $x_{t+4}$.

Additionally, the reference image generator 113 obtains a state transition matrix A from the vectors $x_t$, $x_{t+1}$, $x_{t+2}$, $x_{t+3}$, and $x_{t+4}$ by using the following formula (4).

[Formula 4]

$$A = X_{t+1}^{t+4}(X_t^{t+3})^+ \quad (4)$$

The matrix $X_{t+1}^{t+4}$ given by the following formula (5), while the matrix $X_t^{t+3}$ is given by the following formula (6).

[Formula 5]

$$X_{t+1}^{t+4} = [x_{t+1} x_{t+2} x_{t+3} x_{t+4}] \quad (5)$$

[Formula 6]

$$X_t^{t+3} = [x_t x_{t+1} x_{t+2} x_{t+3}] \quad (6)$$

In formula (4), $(X_t^{t+3})^+$ shows a pseudo inverse matrix.

The reference image generator 113 also obtains a state vector $x_{t+5}$ by using the following formula (7) with the state transition matrix A obtained as described above.

[Formula 7]

$$X_{t+5}^{t+5} = x_{t+5} = AX_{t+4}^{t+4} = Ax_{t+4} \quad (7)$$

Then, the reference image generator 113 produces a new reference image $y''_{t+5}$ having a characteristic of a dynamic texture based on the state vector $x_{t+5}$ and the observation matrix C as shown in the following formula (8).

[Formula 8]

$$Y_{t+5}^{t+5} = y''_{t+5} = CX_{t+5}^{t+5} = Cx_{t+5} \quad (8)$$

The new reference image is stored in the frame memory 104 through a line L115.

In producing the new reference image, the observation matrix C is obtained from the vectors $x_t$, $x_{t+1}$, $x_{t+2}$, $x_{t+3}$, and $x_{t+4}$ as shown in formula (1), while new reference images added in the frame memory 104 by the reference image generator 113 in the past processes are not used. The new reference images having been added, however, may be used for calculating the observation matrix C, for example, if the new reference images have high reliability. Furthermore, in producing new reference images, any methods may be used besides the singular value decomposition. The methods include eigenvalue decomposition, LU decomposition, and Cholesky decomposition.

The prediction signal generator 103 produces a prediction signal with respect to a target pixel signal of a target block of a subsequent frame by using at least the new reference image. In other words, the prediction signal generator 103 may produce the prediction signal by using both the pre-existing reference images and the new reference image, or using the new reference image alone. For example, the prediction signal generator 103 determines a reference block most similar to a pixel signal of a target block as a prediction signal for these reference images. An identifier to identify the reference image to which the prediction signal belongs and a motion vector indicating a displacement from a target block location are sent to a transmission side. (Details are described in "H.264 and MPEG-4 Video Compression", John Wiley & Sons, 2003 by Iain E. G. Richardson.) The prediction signal generator 103 specifies the pre-existing reference images or the new reference images in the frame memory 104 by referring to identification information attached to the pre-existing reference images or the new reference images. In this case, after a reproduction signal of a frame just before a target frame is stored in the frame memory 104, the prediction signal generator 103 produces a new reference image from the reference images of the latest five frames including the reproduction image. The method, however, is not limited to this. The prediction signal generator 103 may obtain the observation matrix C and the state vector $x_{t+5}$ and thereafter directly produce a prediction signal of a target pixel signal by using them.

Figure 3:
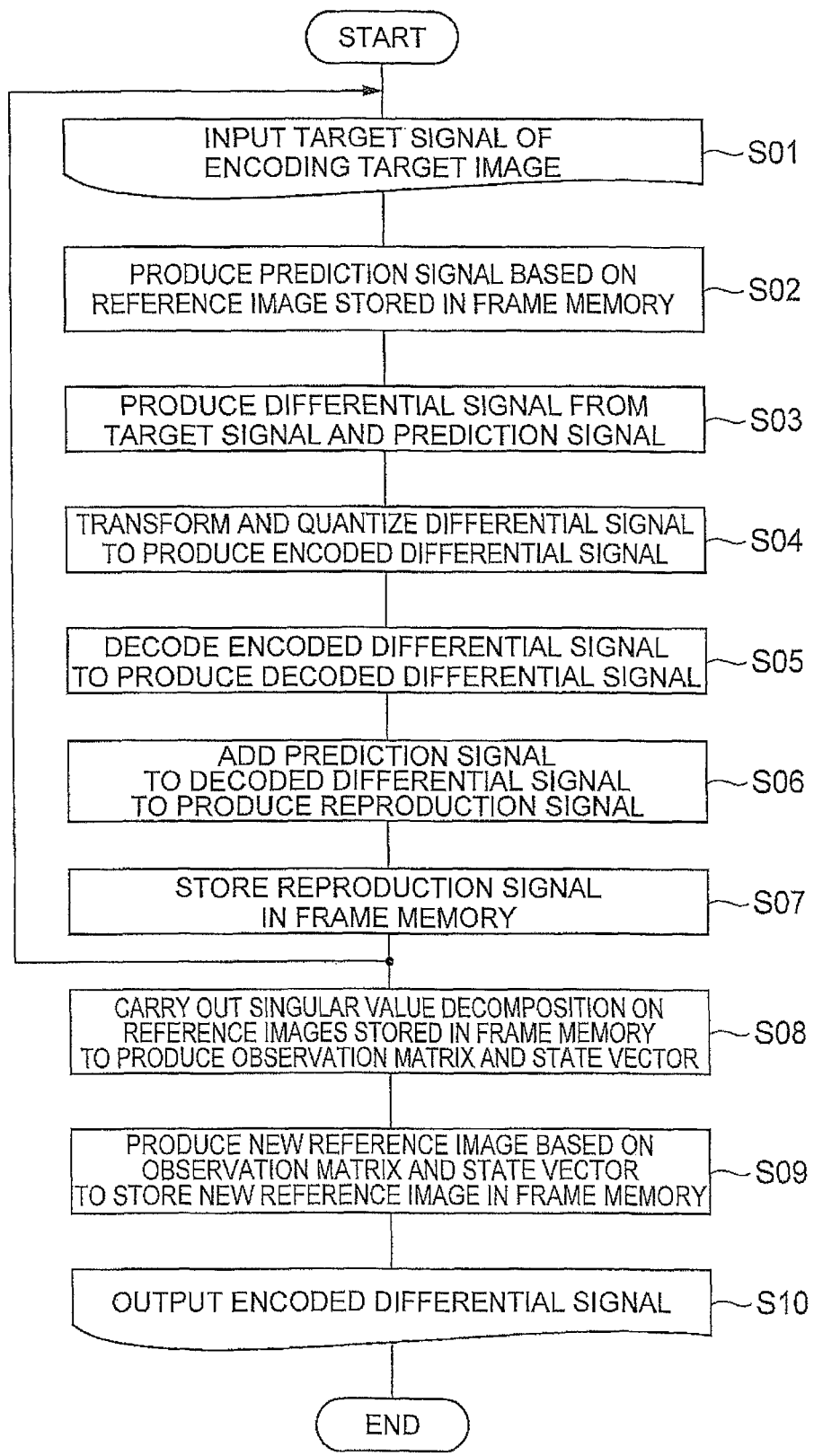
FIG. 3 is a flowchart showing example operation of the moving picture encoding device of FIG. 1.

The operation of the moving picture encoding device 1 is described in detail hereinafter and a moving picture encoding method according to the embodiment is explained with reference to FIG. 3.

First, the block divider 102 inputs a target pixel signal of a target block serving as an encoding target (step S01). Next, the prediction signal generator 103 produces a prediction signal with respect to the target pixel signal by using a reference image stored in the frame memory 104 (step S02). Then, the subtractor 105 produces a differential signal based on the target pixel signal and the prediction signal (step S03). Thereafter, the differential signal is transformed by the transformer 106 and quantized by the quantizer 107, resulting in an encoded differential signal being produced (step S04).

The encoded differential signal is inverse-quantized by the inverse quantizer 108 and inverse-transformed by the inverse transformer 109, resulting in a decoded differential signal being reproduced (step S05). Furthermore, the adder 110 adds the prediction signal to the decoded differential signal to produce a reproduction signal (step S06). The reproduction signal is then stored in the frame memory 104 as a reference image (step S07). These processes on the target block are repeated on all target blocks in a target frame.

After one frame serving as the encoding target is encoded, the reference image generator 113 carries out the singular value decomposition process on a part of pre-existing reference images stored in the frame memory 104 to produce the observation matrix C and the state vector $x_{t+5}$ (step S08). Next, the reference image generator 113 produces a new reference image based on the observation matrix C and the state vector $x_{t+5}$. The new reference image is then stored in the frame memory 104 as a reference image in encoding a subsequent frame (step S09). These processes for producing a new reference image are repeated on all moving pictures or a part of frames. Meanwhile, the encoded differential signal of the target frame is processed by the entropy encoder 111 to be included in compressed data, and output (step S10).

Figure 4:
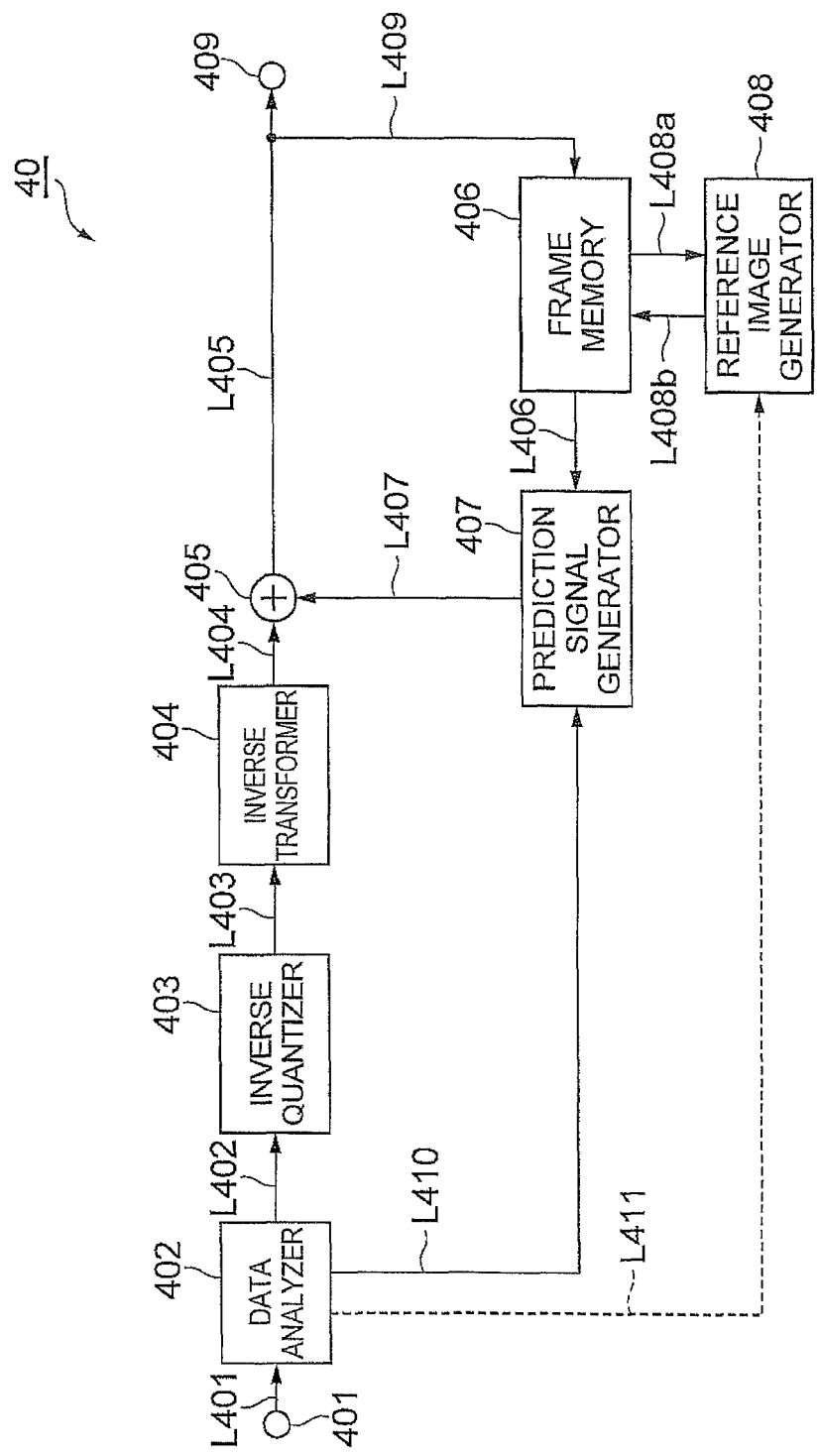
FIG. 4 is a block diagram showing an example structure of a moving picture decoding device according to the first embodiment of the present invention.

(Moving picture decoding device) FIG. 4 is a block diagram showing an example structure of a moving picture decoder or decoding device 40 included in the moving picture encoding and decoding system. The moving picture decoding device 40 may be a computing device or computer, including for example software, hardware, or a combination of hardware and software, as described later, capable of performing the described functionality. The moving picture decoding device 40 may be one or more separate systems or devices included in the moving picture encoding and decoding system, or may be combined with other systems or devices within the moving picture encoding and decoding system. In other examples, fewer or additional blocks may be used to illustrate the functionality of the moving picture decoding device 40. The moving picture decoding device 40 shown in the diagram is provided with an input terminal (an input section) 401, a data analyzer (an input section) 402, an inverse quantizer (a decoding section) 403, an inverse transformer (a decoding section) 404, an adder (an adding section) 405, a prediction signal generator (a prediction signal generation section) 407, a frame memory (a storage section) 406, a reference image generator (a reference image generation section) 408 and an output terminal 409. Example operation of each element of the moving picture decoding device 40 is described below. The term "section" may be defined to include one or more executable modules. As described herein, the sections are defined to include software, hardware or some combination thereof executable by a processor. Software modules may include instructions stored in the frame memory 406, or other memory device, that are executable by the processor or other processor. Hardware modules may include various devices, components, circuits, gates, circuit boards, and the like that are executable, directed, and/or controlled for performance by the processor.

The data analyzer 402 receives compressed data from the input terminal 401. The compressed data is compression-encoded data including an encoded differential signal. The data analyzer 402 analyses the compressed data and extracts from the data the encoded differential signal, a motion vector necessary to produce a prediction signal, and quantization parameters to carry out an inverse-quantization process. The data analyzer 402 outputs the extracted encoded differential signal and the quantization parameters to the inverse quantizer 403 through a line L402, and sends information relating to the motion vector to the prediction signal generator 407 through a line L410. The encoded differential signal is decoded by the inverse quantizer 403 and the inverse transformer 404, resulting in a differential signal being restored.

The inverse quantizer 403 inverse-quantizes the encoded differential signal of a target block based on the quantization parameters. The inverse quantizer 403 outputs the inverse-quantized encoded differential signal to the inverse transformer 404 through a line L403.

The inverse transformer 404 inverse-discrete-cosine-transforms the encoded differential signal input from the inverse quantizer 403 to produce a decoded differential signal. The inverse transformer 404 outputs the produced decoded differential signal to the adder 405 through a line L404.

The prediction signal generator 407 produces a prediction signal with respect to the decoded differential signal of a processing target based on the motion vector extracted by the data analyzer 402 and a reference image referred from the frame memory 406. The produced prediction signal is sent to the adder 405 through a line L407.

The adder 405 adds the prediction signal to the decoded differential signal decoded by the inverse transformer 404 to produce a reproduction signal of the target block. The adder 405 then stores the reproduction signal in the frame memory 406 as a reference image. The reproduction signal is transmitted to an external image display device (not shown) through the output terminal 409.

The reference image generator 408 obtains the observation matrix C and the state vector $x_{t+5}$ by the singular value decomposition process based on a part of pre-existing reference images stored in the frame memory 406 in the same manner of the reference image generator 113 of the moving picture encoding device 1 described above. In this case, the observation matrix C is produced by using the pre-existing reproduction images stored in the frame memory 406. The observation matrix C, however, may be produced by using new reference images having been produced in the past processes together with the pre-existing reference images. The reference image generator 408 produces the new reference image $y''_{t+5}$ having characteristics of a dynamic texture in the same manner of the reference image generator 113, and stores the new reference image in the frame memory 406 through a line L408b. Then, the prediction signal generator 407 produces a prediction signal with respect to a target block of a subsequent frame based on at least the new reference image $y''_{t+5}$.

Figure 5:
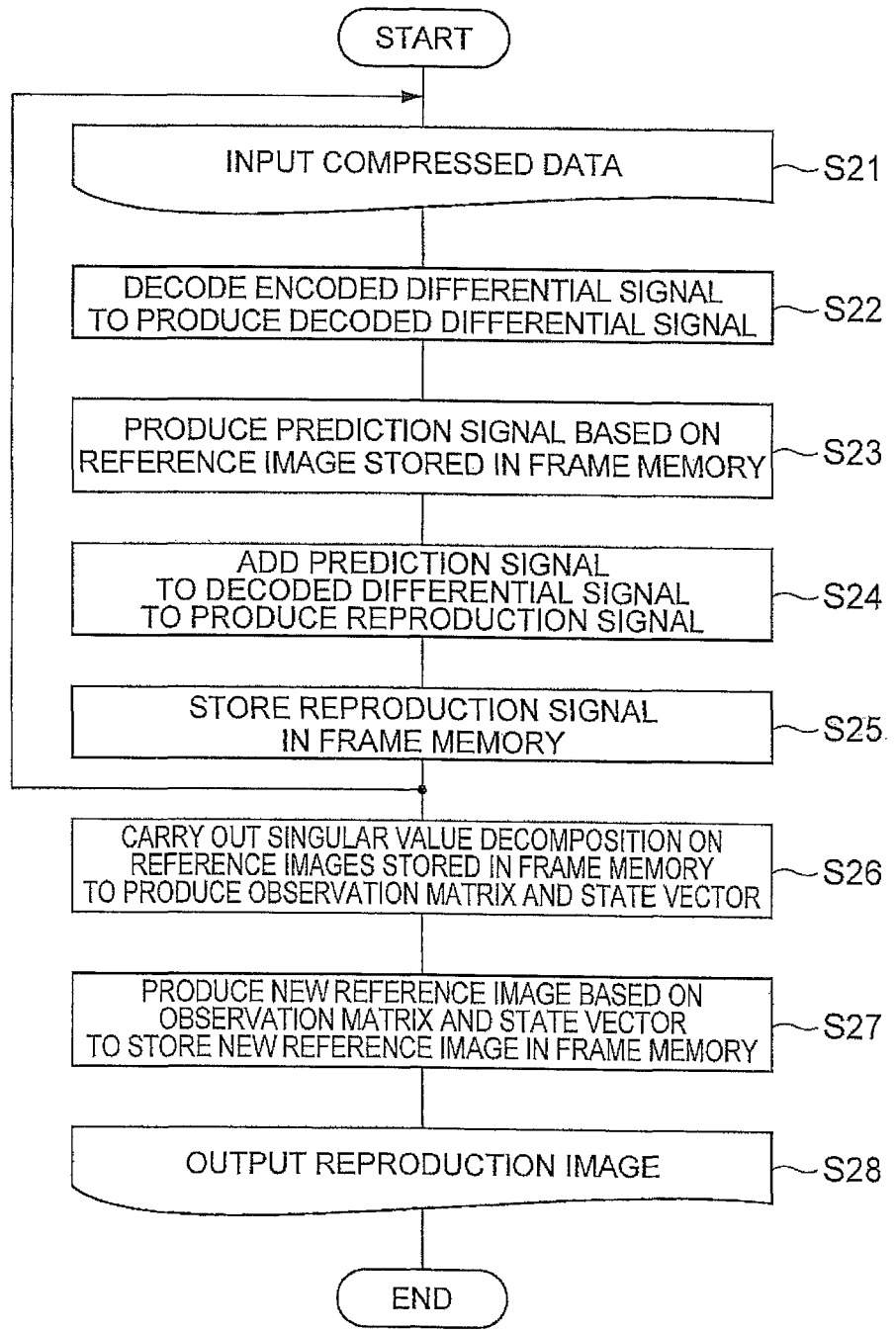
FIG. 5 is a flowchart showing example operation of the moving picture decoding device of FIG. 4.

The operation of the moving picture decoding device 40 is described in detail hereinafter and a moving picture decoding method according to the embodiment is explained with reference to FIG. 5.

First, the data analyzer 402 receives compressed data including an encoded differential signal and extracts the encoded differential signal, a motion vector, and quantization parameters from the compressed data (step S21). Next, the encoded differential signal is decoded by the inverse quantizer 403 and the inverse transformer 404, resulting in a decoded differential signal being formed (step S22). Then, the prediction signal generator 407 produces a prediction signal based on the motion vector and a reference image referred from the frame memory 406 (step S23). Thereafter, the adder 405 adds the prediction signal to the decoded differential signal to produce a reproduction signal (step S24). The reproduction signal is stored in the frame memory 406 as a reference signal (step S25).

At the same time, the reference image generator 408 carries out the singular value decomposition process on reference images stored in the frame memory 406 to obtain the observation matrix C and the state vector $x_{t+5}$ (step S26). The reference image generator 408 then produces the new reference image $y''_{t+5}$ by using the observation matrix C and the state vector $x_{t+5}$, and stores the new reference image in the frame memory 406 (step S27). The produced new reference image $y''_{t+5}$ is used as a reference image for decoding a subsequent frame. These processes are repeated on the encoded differential signals of one frame. After the processes, a reproduction image is output from the output terminal 409 (step S28).

The moving picture encoding device 1 and the moving picture decoding device 40 described above obtain the observation matrix C and the state vector $x_{t+5}$ by using pre-existing reference images that have been already produced and stored in a memory to produce a new reference image based on the observation matrix C and the state vector $x_{t+5}$. The devices then produce a prediction signal with respect to a target pixel signal by using at least the new reference image. Consequently, a reference image suitable for a characteristic of a dynamic texture and not included in the pre-existing reference images can be newly produced. More specifically, the embodiment uses a characteristic that the dynamic texture is expressed by an autoregressive moving average model (ARMA) and produces from the pre-existing reference images, for example, an observation matrix and a state vector used for the model. Thus, a reference image suitable for a characteristic of a dynamic texture and not included in the pre-existing reference images can be newly produced. This enables a prediction signal more similar to a dynamic texture in an encoding target image to be produced, and makes a differential signal small. Consequently, the data amount of a compressed moving picture can be effectively reduced. Additionally, since the prediction signal is produced from a plurality of candidate signals including the new reference image suitable for the dynamic texture together with the pre-existing reference images, the prediction signal more similar to the target pixel signal than the conventional prediction signal can be determined, thus enabling the differential signal to be further made small.

The moving picture encoding and decoding system may include instructions in the form of a computer program, such as a moving picture encoding program that causes a computer to operate as the moving picture encoding device 1 and instructions, such as a moving picture decoding program, that causes a computer to operate as the moving picture decoding device 40.

Instructions in the form of computer software, firmware, data or any other form of computer code and/or computer program readable by a computer within the moving picture encoding and decoding system are provided by being stored in a non-transitory recording medium. Examples of the non-transitory recording medium include non-transitory recording media such as floppy disks, CD-ROMs, DVDs, and ROMs, and semiconductor memories.

Figure 7:
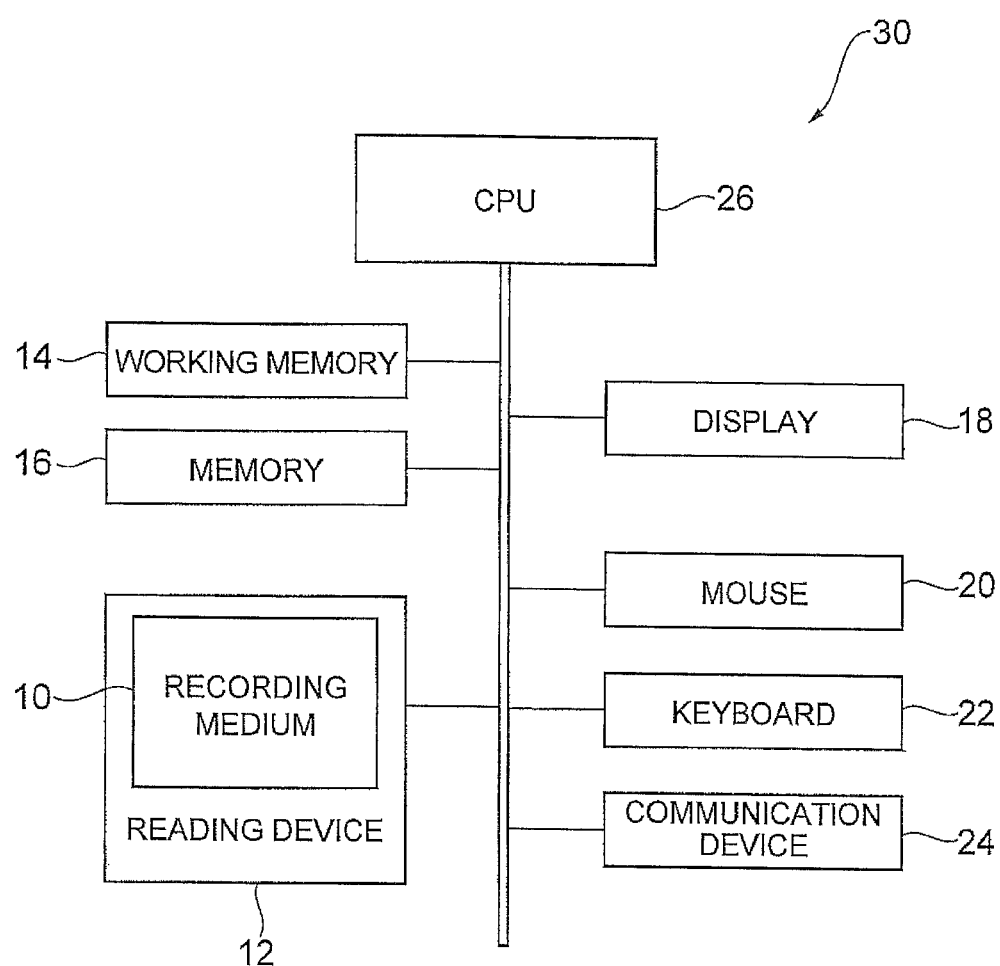
FIG. 7 shows an example hardware configuration of a computer for executing a program stored in a recording medium.
Figure 8:
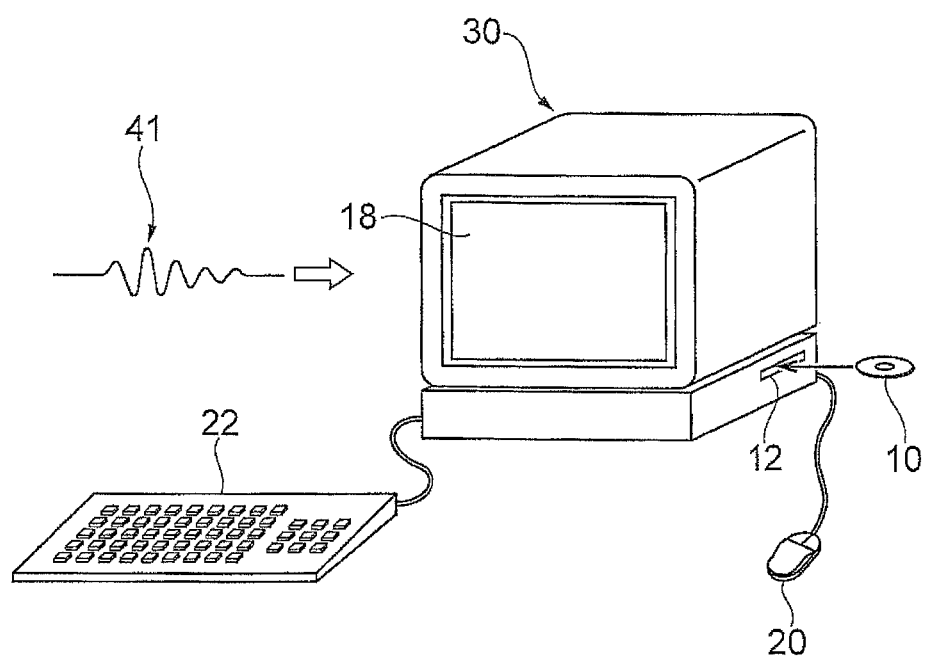
FIG. 8 is a perspective view of the computer for executing the program stored in the recording medium.

FIG. 7 shows a hardware configuration of a computer for executing instructions or code stored in the recording medium. FIG. 8 is a perspective view of the computer for executing the instructions or code stored in the recording medium. The computer includes DVD players, set top boxes, and cell-phones, or any other device which is provided with a CPU, other hardware, and software for processing and controlling.

As shown in the example configuration of FIG. 7, a computer 30 is provided with a reading device 12 such as a floppy disk drive, a CD-ROM drive device, and a DVD drive device, a working memory (RAM) 14 including a resident operating system, a memory 16 that stores a program stored in a recording medium 10, a display device 18 such as a display, a mouse 20 and a keyboard 22 both of which are input devices, a communication device 24 that transmits and receives data and the like, and a CPU 26 that controls the execution of the program. When the recording medium 10 is inserted into the reading device 12, the computer 30 becomes accessible to the moving picture encoding and decoding programs stored in the recording medium 10 from the reading device 12. The moving picture encoding program and the moving picture decoding program enable the computer 30 to operate as the moving picture encoding and decoding system. In other examples, any other form of one or more computing devices, and any configuration of one or more non-transitory storage media may be used to provide the functionality of the moving picture encoding and decoding system.

As shown in the example configuration of FIG. 8, the moving picture encoding program or the moving picture decoding program may be provided through a network as a computer data signal 41 superimposed on a carrier wave, which is not a non-transitory storage medium. In this case, the computer 30 stores to non-transitory storage media, such as the memory 16, the moving picture encoding program or the moving picture decoding program that is received by the communication device 24, and can execute the moving picture encoding program or the moving picture decoding program stored in the non-transitory storage media.

The present invention is not limited to the first embodiment described above. For example, the moving picture encoding device 1 and the moving picture decoding device 40 may so operate that both or either one of the observation matrix C and the state vector $x_{t+5}$ that are used in producing a new reference image is included in compressed data and transmitted to the moving picture decoding device 40 from the moving picture encoding device 1. In this case, a decoding side does not need to carry out the process for producing the observation matrix or the state vector. As a result, the decoding process is efficiently carried out.

Figure 6:
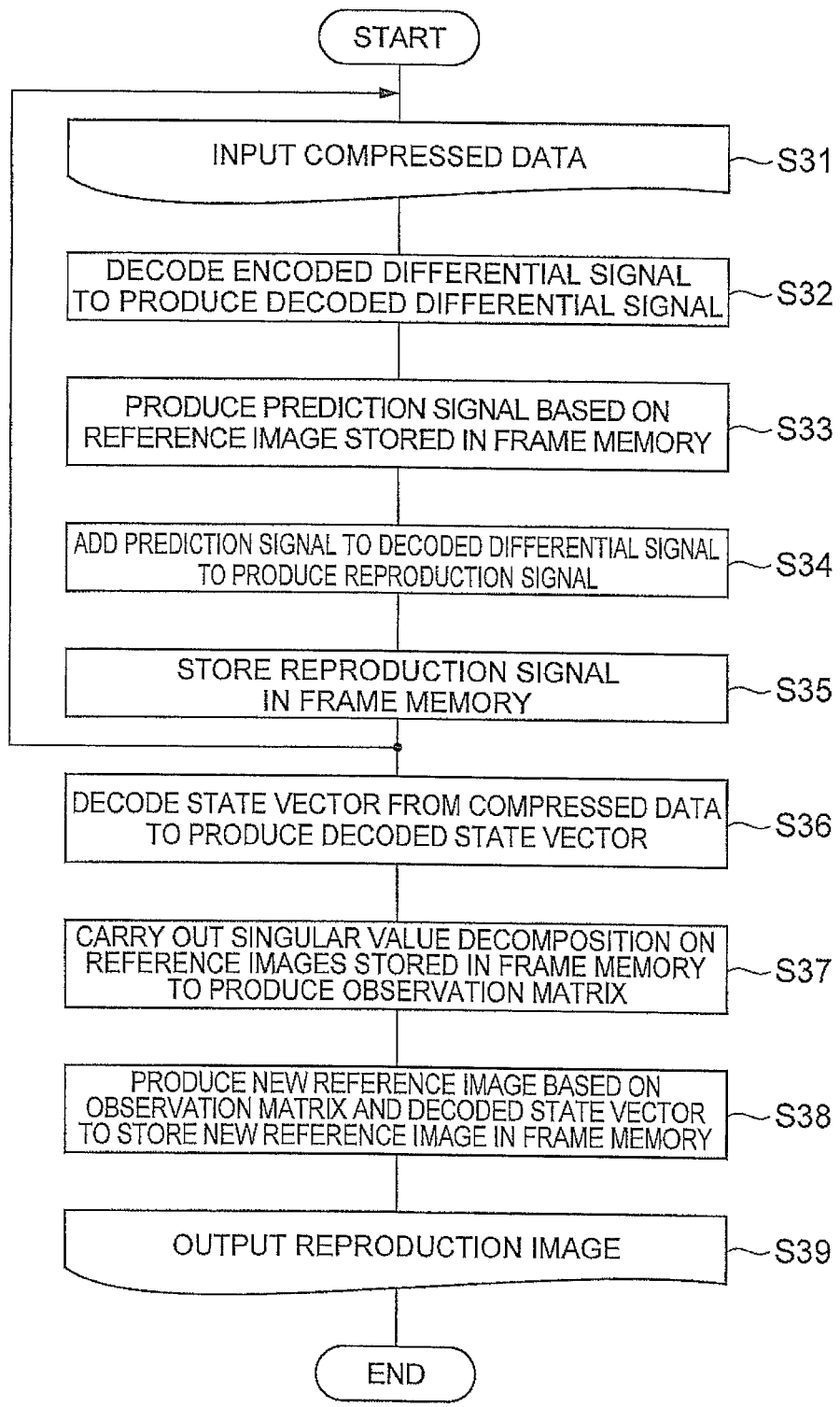
FIG. 6 is a flowchart showing another example operation of a moving picture decoding device.

For example, when the state vector is transmitted, the state vector $x_{t+5}$ produced by the reference image generator 113 is sent to the entropy encoder 111 through a line L117 in the moving picture encoding device 1 as shown in FIG. 1. The entropy encoder 111 variable-length-encodes the state vector $x_{t+5}$. Thereafter, the variable length code is output from the output terminal 112 as compressed data. FIG. 6 is a flow chart showing the example operation of the moving picture decoding device 40 in this case. The processes from inputting compressed data to storing a reproduction image in the frame memory 406 (step S31 to step S35) are substantially the same as those of step S21 to step S25 shown in FIG. 5. After storing the reproduction image, the data analyzer 402 extracts and variable-length-decodes the state vector included in the compressed data to produce a decoded state vector. At the same time, the decoded state vector is sent to the reference image generator 408 through a line L411 (step S36). This case is based on an assumption that the state vector is variable-length-encoded. If the state vector is compressed by a specific encoding method, the encoded state vector is decoded by a decoding method corresponding to the encoding method, and then the decoded state vector is sent to the reference image generator 408. Next, the reference image generator 408 obtains the observation matrix C by referring to the frame memory 406 (step S37). Thereafter, the reference image generator 408 produces a new reference image by using the observation matrix C and the decoded state vector $x_{t+5}$ sent from the data analyzer 402 (step S38). Lastly, a reproduction image of one frame is output from the output terminal 409 (step S39).

The state vector $x_{t+5}$ may be quantized and transmitted for compressing the data amount. In this case, a new reference image needs to be produced from the inverse-quantized state vector $x_{t+5}$ and the observation matrix C in order to maintain the consistency of the encoding side and the decoding side.

The state vector $x_{t+5}$ used in producing a new reference image may be calculated by formula (7) or (8). In other words, the state vector $x_{t+5}$ most suitable for the target frame $y_{t+5}$ can be produced by multiplying the encoding target frame $y''_{t+5}$ by the inverse matrix of the observation matrix C.

All processes carried out by the reference image generator 408 may be performed by the prediction signal generator 407. Specifically, the prediction signal generator 407 may obtain the observation matrix C and the state vector $x_{t+5}$ by using pre-existing reference images stored in the frame memory 406 and directly produce a prediction signal based on the observation matrix C and the state vector $x_{t+5}$. In this case, both or either one of the observation matrix C and the state vector $x_{t+5}$ may also be acquired from the encoding side.

There is a case where a signal having a characteristic of a dynamic texture is included in a part of target pixel signals in a target frame. In this case, the process for producing a new reference image may be carried out selectively on a partial region but not for the whole of the frame. For example, there may be a case where a target block having a dynamic texture in a reproduction signal is identified by a block number, and the reference image generator 113 is set to be active (is activated) when a prediction signal with respect to the target block having the block number is produced.

Second Embodiment

A second embodiment of the present invention is described with reference to the accompanying drawings. A moving picture encoding and decoding system that includes a moving picture encoding device and a moving picture decoding device according to the second embodiment partially differ from the moving picture encoding and decoding system that includes the moving picture encoding device and the moving, picture decoding device according to the first embodiment. The different points are mainly described below.

Figure 9:
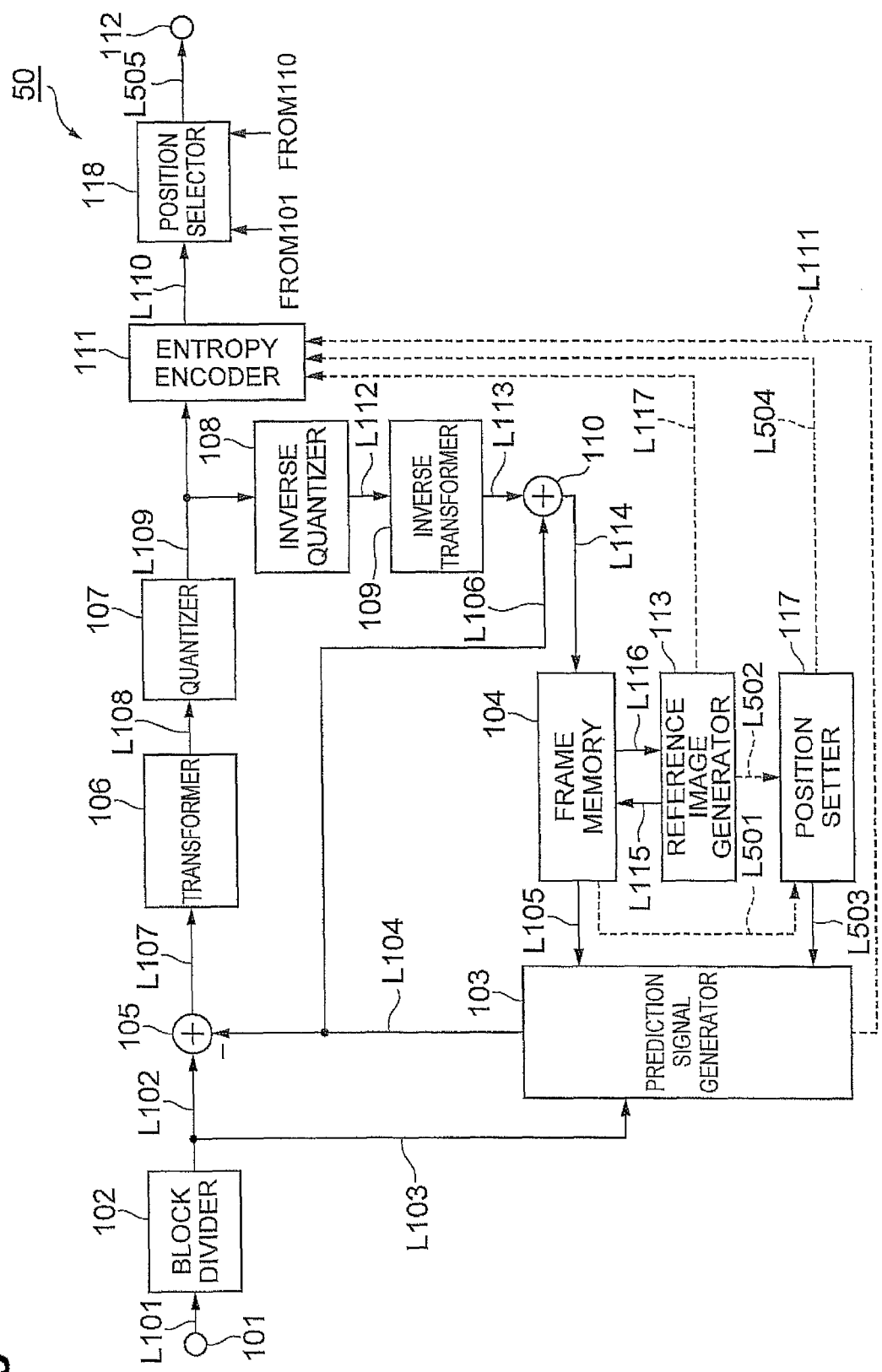
FIG. 9 is a block diagram showing a structure of an example moving picture encoding device according to a second embodiment of the present invention.

(Moving picture encoding device) FIG. 9 is a block diagram showing an example structure of the moving picture encoding device according to the second embodiment of the present invention. A moving picture encoding device 50 shown in the diagram is provided with the input terminal (the input section) 101, the block divider (a dividing section) 102, the prediction signal generator (the prediction signal generation section) 103, the frame memory (the storage section) 104, the subtractor (the difference generation section) 105, the transformer (the encoding section) 106, the quantizer (the encoding section) 107, the inverse quantizer (the decoding section) 108, the inverse transformer (the decoding section) 109, the adder (the adding section) 110, the entropy encoder (an entropy encoding section) 111, the output terminal 112, the reference image generator (the reference image generation section) 113, a position setter (a position setting section) 117, and a position selector 118. In other examples, fewer or additional blocks may be used to illustrate the functionality of the moving picture encoding device of this embodiment.

The position setter 117 sets an insertion position of a new reference image in a reference image list that controls a plurality of reference images, and produces positional information that specifies the set insertion position. The reference image list controls the plurality of reference images with reference image numbers assigned thereto. If the reproduction images of the frames 201 to 205 shown in FIG. 2 are the reference images, an exemplary list is shown in Table 901 in FIG. 14. Such reference image list is, for example, included in the prediction signal generator 103. The prediction signal generator 103 produces a prediction signal with respect to a target pixel signal of a target block by using a reference image selected from the reference images included in the reference image list. In the reference image list, the reference image used in producing the prediction signal can be identified by the reference image number. The reference image numbers show a tendency that as the number decreases, the code quantity needed for encoding decreases. Therefore, setting a smaller reference image number to a reference image that is more frequently selected can improve encoding efficiency.

When setting the insertion position of the new reference image in the reference image list, the position setter 117 acquires information on pre-existing reference images from the frame memory 104 through a line L501 and information on the new reference image from the reference image generator 113 through a line L502 and sets the insertion position of the new reference image. The method of producing the new reference image in the reference image generator 113 is the same as that of the first embodiment. The description is, thus, omitted herein. The position setter 117 determines the insertion position of the new reference image in the reference image list (e.g., Table 901 in FIG. 14). The method of determining the insertion position by the position setter 117 may include a method in which the position is determined based on a new reference image selected rate in the past frames, and a method in which the position is determined based on a result of analyzing a texture signal rate in an image. The method, however, is not limited thereto (a technique using rate distortion optimization is described later). The position setter 117 outputs the set or determined positional information to the prediction signal generator 103 through a line L503 and to the entropy encoder 111 through a line L504.

Upon receiving, through the line L503, the positional information (e.g., a reference image number in the reference image list) indicating the insertion position of the new reference image, the prediction signal generator 103 updates the reference image list based on the positional information. Specifically, when receiving the positional information indicating that the insertion position of the new reference image is reference image number 4, the prediction signal generator 103 provided with the reference image list shown in Table 901 in FIG. 14 updates the reference image list from Table 901 to Table 902 in FIG. 14. With the insertion of the new reference image, $y_t$ that is the oldest pre-existing reference image in encoded order is automatically excluded from the updated reference image list. Tables 903 to 906 in FIG. 14 are the updated reference image lists when pieces of positional information are input, the information indicating that the insertion positions of the new reference images are reference image numbers 3, 2, 1, and 0, respectively.

In a case of the bidirectional prediction, two reference image lists are prepared because two prediction signals are produced for a pixel signal of a target block. A reference image list 911 shown in FIG. 15 is an example of the second reference image list. In this example, small reference image numbers, i.e., 0 and 1, are given to the future frames relative to the encoding target frame in display order. As for the first reference image list, Table 901 in FIG. 14 may be used. In this case, as shown in FIGS. 2(a) and 2(b), a determined number, such as five reference images before the encoding target frame (past images) and a determined number, such as two reference images after the encoding target frame (future images), that is, a total predetermined number of reference images, such as seven, need to be stored in the frame memory 104. If the number of reference images is limited to five, five past frames in encoding order may be selected as the reference images of the first reference image list as shown in a reference image list 921 in FIG. 16. The number of reference images is not limited. Any number (one or more) can be optionally set. The number of reference images may be determined in the encoding side and the decoding side in advance. Alternatively, in the encoding side, the number of reference images may be determined on a frame basis or a sequence basis and encoded to be sent to the decoding side. In the bidirectional prediction, the position setter 117 sets respective pieces of positional information specifying the respective insertion positions of new reference images in two reference image lists (e.g., the reference image lists 911 and 921). The respective pieces of positional information specifying the insertion positions in the two reference image lists are output to the prediction signal generator 103 to update the reference image lists and to the entropy encoder 111 to perform entropy-encoding in the same manner described above.

The position setter 117 may output a reference image excluded in updating a reference image list as reference image list formation information together with the positional information to the prediction signal generator 103 through the line L503 and to the entropy encoder 111 through the line L504 to perform encoding in the entropy encoder 111. The prediction signal generator 103 updates the reference image list based on the positional information and the reference image list formation information. In this process, the reference image list formation information may be produced and encoded such that a new reference image of a past frame is included in the reference image list instead of a new reference image of an encoding target frame. Alternatively, encoding is so carried out that the new reference image of the encoding target frame and the new reference image of the past frame are included together in the reference image list. This alternative way can be realized by encoding a combination of the frame number and the reference image type (a pre-existing reference image or a new reference image) for reference image numbers in the reference image list, for example. This method enables a reference image list to be composed of new reference images alone.

When a reference image list is composed of only pre-existing reference images alone excluding a new reference image, the positional information specifying the insertion position of the new reference image instead shows that no new reference image is included in the reference image list. An example of the positional information includes a combination of a flag and the reference image number. The flag shows whether or not a new reference image is included in a reference image list, while the reference image number shows the insertion position of the new reference image. If the flag shows that a new reference image is not included, the reference image number is not encoded. This combination can widen the options of reference images and thus increase a degree of freedom. Particularly, in the bidirectional prediction, one reference image list alone includes a new reference image, while the other reference image list is composed of pre-existing reference images alone.

The prediction signal generator 103 produces a prediction signal of a target block based on the updated reference image list after completion of updating the reference image list. The prediction signal generator 103 also detects the reference image number and the motion vector used for predicting the target block and outputs the reference image number and the motion vector to the entropy encoder 111 through the line L111. If a new reference image is used for prediction on the target block, a prediction signal of the target block may be produced without the output of the motion vector, that is, with a zero motion vector.

The position selector 118 selects an insertion position of a new reference image in a reference image list by a rate distortion optimization method, and determines the position. After the reference image generator 113 produces a new reference image, the position selector 118 carries out the position setting, encoding, and local decoding processing, as described above, on each candidate of the insertion position of the new reference image (e.g., the reference image lists 902 to 906) by using the input terminal 101, the block divider 102, the prediction signal generator 103, the frame memory 104, the subtractor 105, the transformer 106, the quantizer 107, the inverse quantizer 108, the inverse transformer 109, the adder 110, the entropy encoder 111, and the position setter 117. The position selector 118 acquires encoded data of each candidate through the line L110 and calculates the code quantity. The position selector 118 acquires an input image of an encoding target frame from the input terminal 101 and a reproduction image of the encoding target frame from the adder 110, and calculates an encoding distortion (a mean square error) in each candidate. The position selector 118 calculates a sum of a code quantity that is multiplied by a weight coefficient determined by quantization accuracy and the encoding distortion in each candidate, and selects the insertion position of the new reference image having the minimum sum value. The position selector 118 outputs the encoded data of the selected candidate to the output terminal 112 through a line L505, and controls the frame memory 104 in such a manner that only the reproduction signal of the selected candidate becomes effective. In this way, the position selector 118 determines the insertion position of the new reference image. When the position setter 117 determines the insertion position of the new reference image by a method such as the determination method based on the selected rate of new reference images as described above, instead of the rate distortion optimization method, the position selector 118 is not required.

Figure 10:
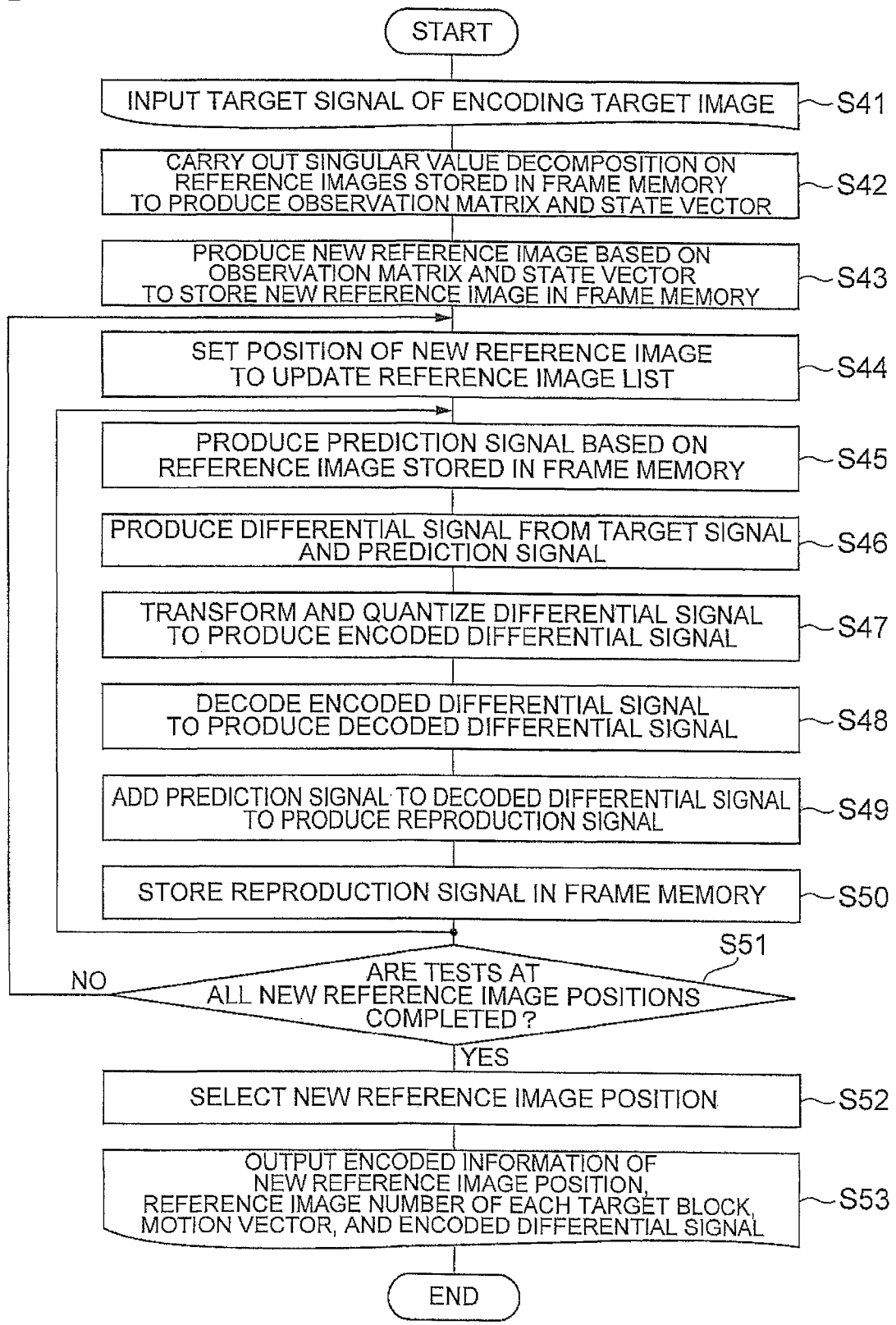
FIG. 10 is a flowchart showing an example operation of the moving picture encoding device of FIG. 9.

The example operation of the moving picture encoding device 50 is described in detail hereinafter and an example of a moving picture encoding method by a rate distortion optimization method is explained with reference to FIG. 10.

A case is assumed where before a target signal of an encoding target image is input, the processes of steps S45 to S50 described later are carried out on a plurality of past input images. In other words, the following processes are carried out on other encoding target signals before an encoding target signal is input. Specifically, the prediction signal generator 103 produces a prediction signal with respect to a target pixel signal by using a plurality of reference images stored in the frame memory 104 (in the same manner of step S45 described later). Then, the subtractor 105 produces a differential signal based on the target pixel signal and the prediction signal (in the same manner of step S46 described later). Thereafter, the differential signal is transformed into a frequency domain and quantized by the transformer 106 and the quantizer 107, resulting in an encoded differential signal being produced (in the same manner of step S47 described later). The encoded differential signal is inverse-quantized and inverse-transformed by the inverse quantizer 108 and the inverse transformer 109, resulting in a decoded differential signal being reproduced (in the same manner of step S48 described later). Furthermore, the adder 110 adds the prediction signal to the decoded differential signal to produce a reproduction signal (in the same manner of step S49 described later). Then, the reproduction signal is stored in the frame memory 104 as a reference image (in the same manner of step S50 described later).

Subsequently, the target signal of the encoding target image is input (step S41). The reference image generator 113 carries out the singular value decomposition process on a part of pre-existing reference images stored in the frame memory 104 to produce the observation matrix C and the state vector $x_{t+5}$. Next, the reference image generator 113 produces a new reference image based on the observation matrix C and the state vector $x_{t+5}$. The new reference image is then stored in the frame memory 104 as a reference image in encoding a subsequent frame (step S43). These processes for producing a new reference image are repeated on all moving pictures or a part of the frames. Both or either one of the produced observation matrix C and the state vector $x_{t+5}$ may be transmitted to a receiving side.

Then, in step S44, the position setter 117 produces positional information for setting the insertion position of the new reference image in a reference image list composed of reference images of pre-existing reproduction images (e.g., Table 901 in FIG. 14, Table 911 in FIG. 15, and Table 921 in FIG. 16), and outputs the positional information to the prediction signal generator 103. The prediction signal generator 103 receives the positional information and updates the reference image list based on the positional information to obtain the updated reference image list (e.g., Tables 902 to 906 in FIG. 14, Tables 911 to 916 in FIG. 15, and Tables 921 to 926 in FIG. 16).

Next, in step S45, a reference image and a motion vector used for the prediction on the target block are detected based on the reference image list updated in step S44. In the step, if the new reference image is selected, a prediction signal may be produced with a zero motion vector without sending of the motion vector. Subsequently, the processes of steps S46 to S50 are carried out as described above. Thereafter, in step S51, the step flow is so controlled that the insertion position of the new reference image is changed in step S44 and the processes from step S45 to step S50 (basic encoding steps) are repeated in order to determine the insertion position of the new reference image in the updated reference image list. Upon completion of tests by the basic encoding steps at all setting positions (e.g., reference image numbers 0 to 4), the flow proceeds to step S52. In step S52, the code quantity and the encoding distortion (a mean square error of an input image and a reproduction image) in each of the repeated basic encoding steps are calculated, and a sum of the code quantity that is multiplied by a weight coefficient determined by quantization accuracy and the encoding distortion is obtained. Then, the setting position of the new reference image having the minimum sum value is selected and determined, and the frame memory 104 is configured in such a manner that only the result of the selected basic encoding step becomes effective.

Next, in step S53, encoded data including the insertion position of the new reference image selected in step 51 is output from the output terminal 112. The encoded data also includes positional information of the new reference image, the reference image numbers of the target blocks, the motion vector, and the encoded differential signal. In outputting the data, the positional information specifying the insertion position of the new reference image is sent on a frame basis. The positional information specifying the insertion position of the new reference image may be determined on a large region basis and transmitted. The large region is a divided region obtained by dividing a picture plane and includes a plurality of blocks as a group.

While the reference image generator 113 produces a new reference image in the embodiment, the prediction signal generator 103 may obtain the observation matrix C and the state vector $x_{t+5}$ and directly produce a prediction signal. The observation matrix C and the state vector $x_{t+5}$ are obtained by the singular value decomposition method. However, other methods may be employed besides the singular value decomposition method. If an updated reference image list includes no new reference image, the process by the reference image generator 113 does not need to be carried out for the target frame.

In the embodiment, since it is not required to encode and transmit the observation matrix C and the state vector $x_{t+5}$, the observation matrix C and the state vector $x_{t+5}$ are obtained by the same method to produce a new reference image in the receiving side (the decoding side) as described later. The state vector $x_{t+5}$ may be encoded and transmitted to reduce the process amount in the receiving side. In this case, the obtained state vector $x_{t+5}$ is sent to the entropy encoder 111 through the line L117 to be entropy-encoded, and then the entropy-encoded state vector $x_{t+5}$ is output and transmitted to the outside. If the prediction signal generator 103 obtains the state vector $x_{t+5}$, the state vector $x_{t+5}$ is output and transmitted to the outside through the line L111.

In the embodiment, the state vector $x_{t+5}$ is obtained by formula (7) and may also be obtained by formula (8). In other words, the state vector $x_{t+5}$ most suitable for the target frame $y''_{t+5}$ can be produced by multiplying the encoding target frame $y''_{t+5}$ by the inverse matrix of the observation matrix C. The state vector $x_{t+5}$ may be quantized and transmitted to reduce the data amount. In this case, a new reference image needs to be produced from the inverse-quantized state vector $x_{t+5}$ and the observation matrix C in order to maintain the consistency of the sending side and the receiving side. Instead of sending the state vector $x_{t+5}$ as described above, the observation matrix C also can be sent. Both the observation matrix C and the state vector $x_{t+5}$ may be sent. There is a case where a signal having a characteristic of a dynamic texture is included in a part of a picture plane. In this case, the process for producing a new reference image may be carried out on a partial region but not for the whole of the frame.

In the embodiment, information specifying an insertion position of a new reference image is sent on a frame basis. The information specifying the insertion position of the new reference image may be sent on a large region basis. The large region is a divided region obtained by dividing a picture plane and includes a plurality of blocks as a group. In this case, the position setter 117 and the prediction signal generator 103 make up an updated reference image list for every large region. The prediction signal generator 103 selects a reference image based on an updated reference image list of a large region to which a target block belongs, and sends the reference image number to the entropy encoder 111. The definition of such a large region may be determined by the encoding and decoding sides in advance (e.g., a picture plane is divided in quarters to form four large regions). Alternatively, the formation of large regions may be determined by the encoding side, and encoded by the entropy encoder 111. This method enables the following processes to be carried out: a new reference image is added to a reference image list for a large region including a dynamic texture, while a reference image list for a large region including no dynamic texture is composed of pre-existing reference images alone. The insertion position of a new reference image in a reference image list is encoded. The insertion position may be determined by already-decoded information. For example, an insertion position of a new reference image in a reference image list may be automatically determined based on the selected rate of new reference images in frames having been encoded in the past processes.

(Moving picture decoding device) The structure of an example moving picture decoding device according to the second embodiment is described below. FIG. 10 is a block diagram showing the structure of the moving picture decoding device according to the second embodiment. A moving picture decoding device 60 shown in the diagram is provided with the input terminal (the input section) 401, an entropy decoder (an entropy decoding section) 410, the inverse quantizer (the decoding section) 403, the inverse transformer (the decoding section) 404, the adder (the adding section) 405, the prediction signal generator (the prediction signal generation section) 407, the frame memory (the storage section) 406, the reference image generator (the reference image generation section) 408 and the output terminal 409. In other examples, fewer or additional blocks may be used to illustrate the functionality of the moving picture decoding device of this embodiment.

The input terminal 401 receives compressed data including an encoded differential signal obtained by prediction-encoding a moving picture. Such compressed data includes data obtained by being processed in the moving picture encoding device 50 in FIG. 9. The compressed data includes a motion vector necessary to produce a prediction signal, a reference image number to identify a reference image, quantization parameters to carry out an inverse-quantization process, data of the state vector $x_{t+5}$ to produce a new reference image, and positional information specifying the insertion position of the new reference image, besides the encoded differential signal as described above. If the state vector $x_{t+5}$ is produced by the moving picture decoding device 60, the state vector $x_{t+5}$ may not be necessarily included in the compressed data.

The entropy decoder 410 analyzes the input compressed data, restores the input compressed data to original numerical values and the like by entropy-decoding, and extracts the encoded differential signal and the like described above from the compressed data. The entropy decoder 410 outputs the extracted encoded differential signal and quantization parameters to the inverse quantizer 403 through the line L402, and also sends information relating to the motion vector to the prediction signal generator 407 through the line L410. The encoded differential signal is decoded by the inverse quantizer 403 and the inverse transformer 404, resulting in a differential signal being restored. The entropy decoder 410 also sends restored positional information specifying the insertion position of the new reference image to the prediction signal generator 407 through a line L412.

The prediction signal generator 407 produces a prediction signal with respect to the decoded differential signal of a processing target. Upon receiving the positional information specifying the insertion position of the new reference image from the entropy decoder 410, the prediction signal generator 407 updates the reference image list in the same manner of the prediction signal generator 103 of the moving picture encoding device 50. If no new reference image is included, the reference image list is not updated. If the compressed data includes reference image list formation information to produce a reference image list, the prediction signal generator 407 acquires the reference image list formation information decoded by the entropy decoder 410 through the line L412 so as to use the information to update the reference image list. Such reference image list formation information includes, for example, information on pre-existing reference image excluded from the reference image list as described above. When the reference image list formation information includes a combination of the frame numbers and the reference image types (pre-existing reference image or new reference image) with respect to the respective reference image numbers in the reference image list, the reference image list can be explicitly updated.

The prediction signal generator 407 accesses a reference image in the frame memory 406 based on the motion vector and the reference image number to produce a prediction signal of a target block serving as a decoding target. When it is determined in advance that the motion vector information of a block in which the reference image number indicates a new reference image is not included in the compressed data, the prediction signal of the target block is produced from the new reference image with a zero motion vector. The prediction signal obtained in this way is sent to the adder 405 through the line L407. In the adder 405, the prediction signal is added to the decoded differential signal to produce a reproduction signal.

The reference image generator 408 obtains the observation matrix C and the state vector $x_{t+5}$ by the singular value decomposition process based on a part of pre-existing reference images stored in the frame memory 406 in the same manner of the reference image generator 113 of the moving picture encoding device 50 described above. When the compressed data includes the state vector $x_{t+5}$, the state vector $x_{t+5}$ is acquired from the entropy decoder 410 through a line L411 and used. The state vector $x_{t+5}$ included in the compressed data is entropy-encoded. If the state vector $x_{t+5}$ is compressed by a specific encoding method other than entropy-encoding, the state vector $x_{t+5}$ output from the entropy decoder 410 is decoded by a decoding process corresponding to the specific encoding method. Thereafter, the decoded state vector $x_{t+5}$ is sent to the reference image generator 408. The observation matrix C is obtained by using a reproduction image. The observation matrix C, however, may be obtained by using new reference images having been produced in the past processes together with the reproduction image.

The reference image generator 408 produces the new reference image $y''_{t+5}$ having a characteristic of a dynamic texture based on formula (8) with the observation matrix C and the state vector $x_{t+5}$ in the same manner of the first embodiment. The produced new reference image $y''_{t+5}$ is stored in the frame memory 406 through the line L408b. The prediction signal generator 407 produces a prediction signal of a target block of a subsequent frame based on at least one of the pre-existing reference image and the new reference image in the same manner of the prediction signal generator 103 of the moving picture encoding device 50.

The prediction signal generator 407 can have the processing function of producing a new reference image of the reference image generator 408. In this case, the state vector $x_{t+5}$ is sent to the prediction signal generator 407 through the line L410, and a prediction signal produced by the prediction signal generator 407 is directly sent to the adder 405.

In the embodiment, information specifying the insertion position of the new reference image is received on a frame basis. The information specifying the insertion position of the new reference image may be received on a large region basis. The large region is a divided region obtained by dividing a picture plane and includes a plurality of blocks as a group. In this case, the prediction signal generator 407 makes up an updated reference image list for every large region, and updates it. The prediction signal generator 407 selects a reference image based on the updated reference image list relating to a large region to which a target block belongs. The large region may be determined by the encoding and decoding sides in advance (e.g., a picture plane is divided in quarters to form four large regions). Alternatively, the formation of large regions may be decoded by the entropy decoder 410. The insertion position of the new reference image in the reference image list is decoded. The insertion position may be determined by the decoding side from already-decoded information. For example, an insertion position of a new reference image in a reference image list may be automatically determined based on the selected rate of new reference images in frames having been decoded in the past processes.

Figure 11:
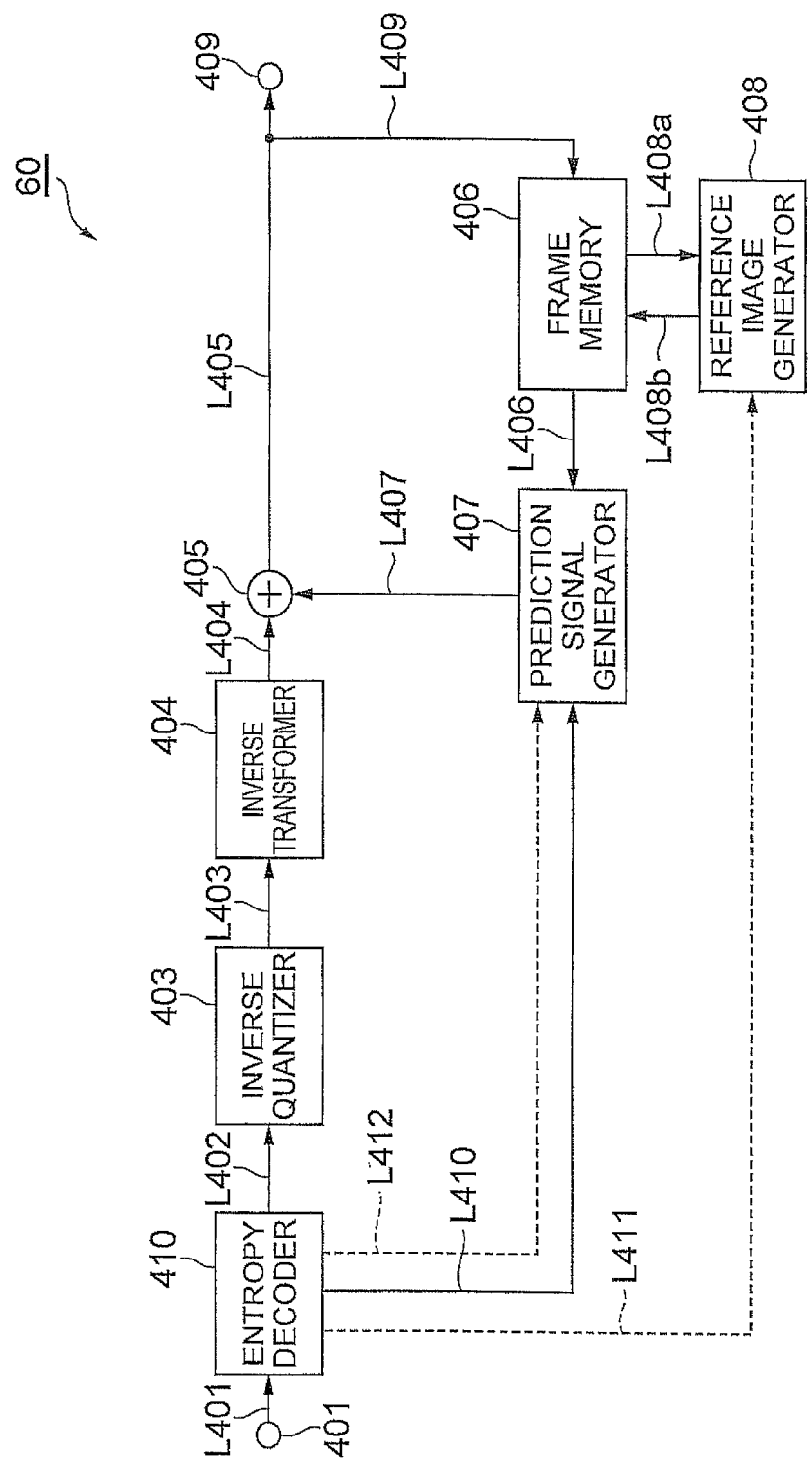
FIG. 11 is a block diagram showing a structure of an example moving picture decoding device according to the second embodiment of the present invention.

Example operation of the moving picture decoding device 60 is described in detail hereinafter and an example of a moving picture decoding method in a case where the compressed data does not include the state vector $x_{t+5}$ is explained with reference to FIG. 11.

A case is assumed where before a decoding process on an image to be decoded is carried out, the processes of steps S65 to S68 described later are carried out, and a plurality of decoded images are already restored. Specifically, the entropy decoder 410 receives compressed data including an encoded differential signal and extracts the encoded differential signal, a motion vector, a reference image number and quantization parameters from the compressed data. Next, the encoded differential signal is decoded by the inverse quantizer 403 and the inverse transformer 404, resulting in a decoded differential signal being formed (step S65 described later). The motion vector and the reference image number necessary for producing a prediction signal of a target block serving as a decoding target are decoded. Then, a prediction signal is produced based on a reference image stored in the frame memory together with the decoded motion vector and the reference image number (step S66 described later). Thereafter, the adder 405 adds the prediction signal to the decoded differential signal to produce a reproduction signal (step S67 described later). The reproduction signal is stored in the frame memory 406 as a reference signal (step S68 described later).

Then, the compressed data including the encoded differential signal serving as a decoding target is input (step S61). In step S62, the singular value decomposition is carried out on reference images (reproduction images) stored in the frame memory 406 to produce the observation matrix C and the state vector $x_{t+5}$. The series of processes are carried out by using formulas (1) to (8) based on the observation matrix C and the state vector $x_{t+5}$ so as to produce a new reference image. The produced new reference image is stored in the frame memory 406 (step S63).

Next, the flow proceeds to step S64, in which positional information is acquired from the compressed data to update a reference image list. The positional information specifies the insertion position of the new reference image in the reference image list (e.g., refer to Table 901 in FIG. 14) composed of reference images of pre-existing reproduction images. The updated reference image list (e.g., refer to Tables 902 to 906 in FIG. 14) is obtained. Then, the flow proceeds to step S65, in which the encoded differential signal is decoded to produce a decoded differential signal. In step S66, the reference image number and the motion vector are decoded. Based on the updated reference image list, a prediction signal of the target block is produced from the reference image specified by the decoded reference image number and the motion vector. Thereafter, steps S67 and S68 are carried out. After the processes from step S65 to step S68 are repeated predetermined times (or until the compressed data is thoroughly input and the restoring process is completed), a reproduction image is output to the output terminal 409 (step S69).

Figure 12:
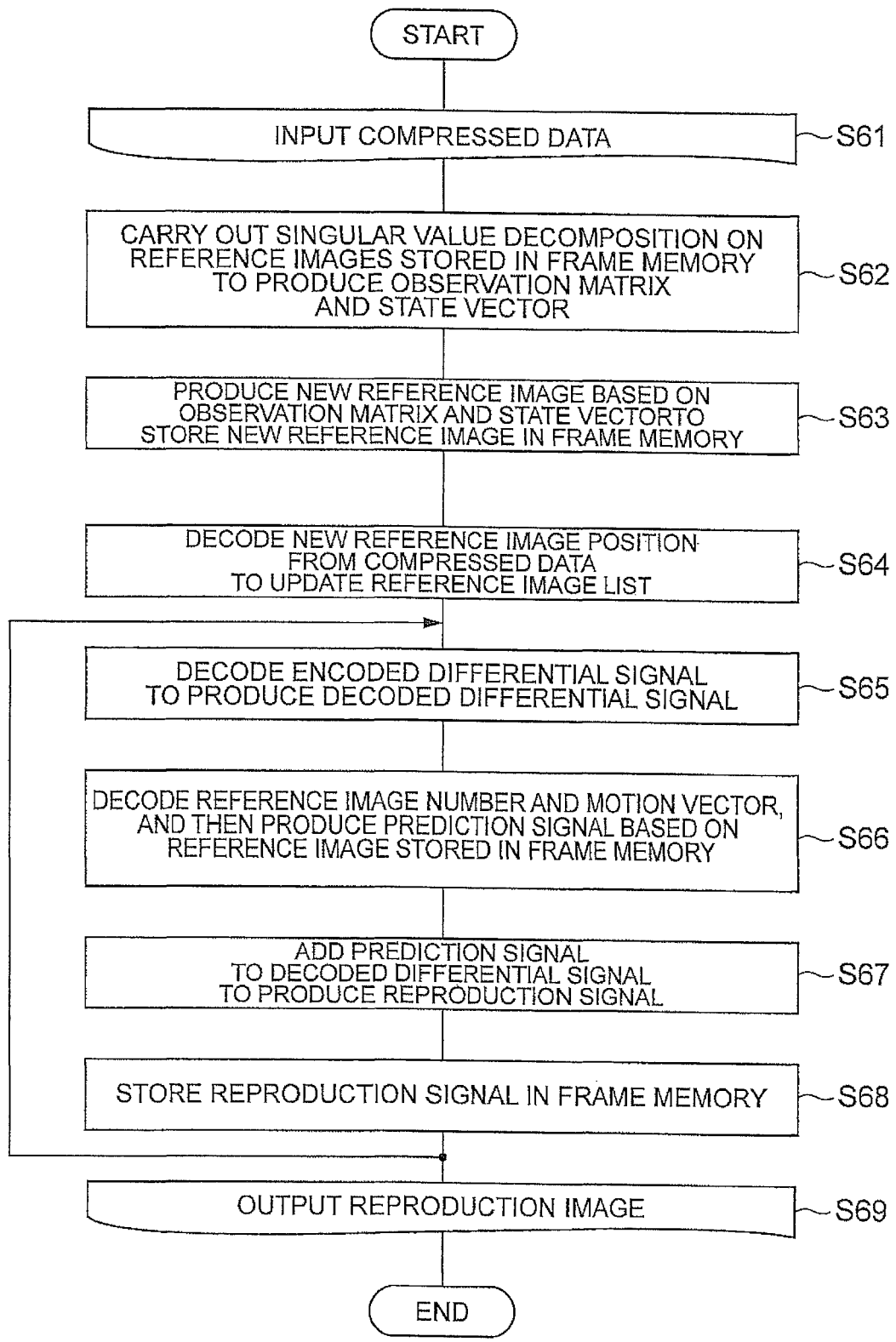
FIG. 12 is a flowchart showing an example operation of the moving picture decoding device of FIG. 11.
Figure 13:
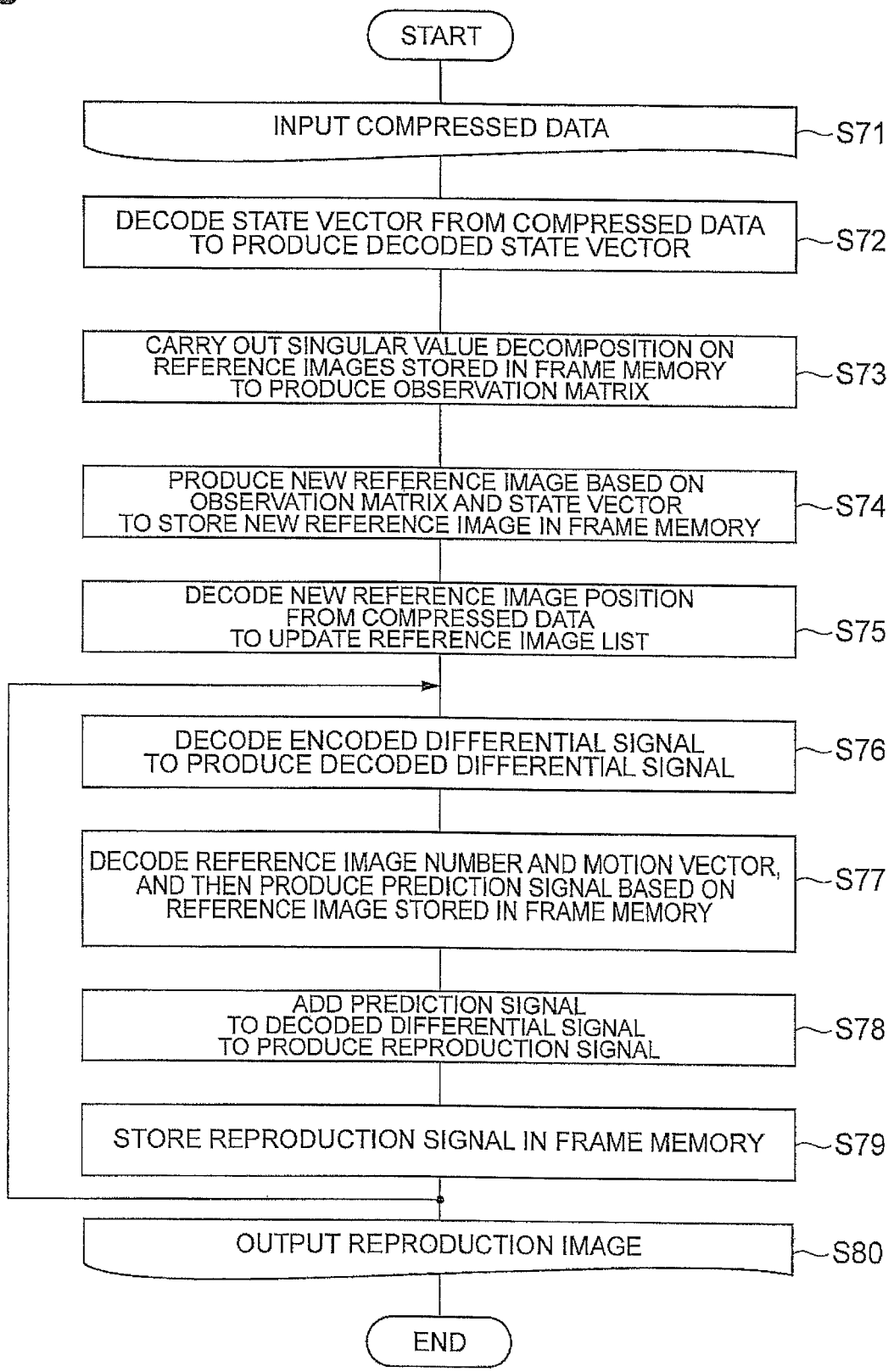
FIG. 13 is a flowchart showing another example operation of the moving picture decoding device of FIG. 11.

Next, a modification of the moving picture decoding method is described with reference to FIG. 13. This modification is an embodiment in a case where the state vector $x_{t+5}$ included in compressed data is transmitted from the encoding side. In the modification, the processes of step S71, and S74 to S80 are the same as those of step S61, and S63 to S69 in FIG. 12. The description thereof is omitted.

In step S72, the state vector $x_{t+5}$ is extracted from the compressed data and decoded to produce a decoded state vector. In step S73, the singular value decomposition is carried out on reference images (reproduction images) stored in the frame memory 406 to produce the observation matrix C. Then, a new reference image is produced based on the observation matrix C and the decoded state vector obtained in step S72 in the same manner of step S63 in FIG. 12 (step S74). The new reference image produced in this way is stored in the frame memory 406 as a reference image for decoding a subsequent frame.

The moving picture encoding device 50 and the moving picture decoding device 60 described above use the characteristic that the dynamic texture is expressed by the autoregressive moving average model (ARMA), obtain the observation matrix C used in the model by using the pre-existing reference images having been already produced, and produce a new reference image based on the observation matrix C. Thus, a reference image suitable for a characteristic of a dynamic texture and not included in the pre-existing reference images can be newly produced. This enables a prediction signal more similar to a dynamic texture in an encoding target image to be produced. As a result, the differential signal is made small and the data amount of a compressed moving picture can be effectively reduced. In other words, a dynamic texture can be efficiently encoded. Additionally, the moving picture encoding device described above etc. uses a reference image list controlling the new reference image and pre-existing reference images, and produces a prediction signal by using a reference image selected from reference images included in the reference image list. This enables a prediction signal more similar to a dynamic texture in an encoding target image to be produced, and makes a differential signal small. Consequently, this enables a signal visually similar to a target signal to be reproduced without encoding the differential signal. Furthermore, the moving picture encoding device etc. encodes the position of the new reference image in the reference image list, thereby reducing the code quantity needed for selecting information of reference images.

A moving picture encoding and decoding system that includes a moving picture encoding program and a moving picture decoding program that cause a computer to operate as the moving picture encoding device 50 and the moving picture decoding device 60 are the same as those of the first embodiment. The descriptions thereof are omitted.

The present invention is directed to a moving picture encoding and decoding system that includes a moving picture encoding device, a moving picture decoding device, a moving picture encoding method, a moving picture decoding method, a moving picture encoding program, and a moving picture decoding program, and can reduce the data amount of a compressed moving picture by producing a prediction signal suitable for a moving picture including a dynamic texture.

REFERENCE SIGNS LIST 1, 50 moving picture encoding device
40, 60 moving picture decoding device
101 input terminal (input section)
102 block divider
103 prediction signal generator (prediction signal generation section)
104 frame memory (storage section)
105 subtractor (difference generation section)
106 transformer (encoding section)
107 quantizer (encoding section)
108 inverse quantizer (decoding section)
109 inverse transformer (decoding section)
110 adder (adding section)
111 entropy encoder (encoding section)
113 reference image generator (reference image generation section)
117 position setter (position setting section)
118 position selector
401 input terminal (input section)
402 data analyzer (input section)
403 inverse quantizer (decoding section)
404 inverse transformer (decoding section)
405 adder (adding section)
406 frame memory (storage section)
407 prediction signal generator (prediction signal generation section)

408 reference image generator (reference image generation section)
410 entropy decoder (entropy decoding section)

What is claimed is:

1. A moving picture decoding device comprising:
a processor;
an input section executed by the processor to receive compressed data including an encoded differential signal obtained by prediction encoding a moving picture;
a decoding section executed by the processor to decode the encoded differential signal so as to produce a decoded differential signal;
a prediction signal generation section executed by the processor to produce a first prediction signal with respect to the decoded differential signal;
an adding section executed by the processor to add the first prediction signal to the decoded differential signal so as to produce a reproduction signal;
a storage section operable to store the reproduction signal as a reference image referred to in producing a second prediction signal; and
a reference image generation section executed by the processor to generate an observation matrix from a matrix composed of a plurality of pixel vectors, each of the pixel vectors in the matrix representing respective different pre-existing reference images stored in the storage section, to produce, based on the observation matrix, a new reference image, and to store the new reference image in the storage section, wherein
the prediction signal generation section is executed by the processor to produce the second prediction signal using at least the new reference image.

2. The moving picture decoding device according to claim 1, wherein the reference image generation section is executed by the processor to generate the observation matrix and a state vector based on the matrix composed of the plurality of pixel vectors and to produce the new reference image based on the observation matrix and the state vector.

3. The moving picture decoding device according to claim 1, wherein the compressed data further includes vector compressed data corresponding to a state vector; the decoding section is further executed by the processor to restore the vector compressed data so as to produce a decoded state vector; and the reference image generation section is further executed by the processor to produce the new reference image based on the observation matrix and the decoded state vector.

4. The moving picture decoding device according to claim 1, wherein the reference image generation section is executed by the processor to generate the observation matrix by carrying out singular value decomposition on the matrix composed of the plurality of pixel vectors.

5. A moving picture decoding device comprising:
a processor;
an input section executed by the processor to receive compressed data including an encoded differential signal obtained by prediction encoding a moving picture;
a decoding section executed by the processor to decode the encoded differential signal so as to produce a decoded differential signal;
a prediction signal generation section executed by the processor to produce a first prediction signal with respect to the decoded differential signal;
an adding section executed by the processor to add the first prediction signal to the decoded differential signal so as to produce a reproduction signal; and
the processor configured to store the reproduction signal as a reference image in a storage section, the reference image referred to in producing a second prediction signal, wherein
the prediction signal generation section is further executed by the processor to obtain at least one of an observation matrix or a state vector by using a matrix composed of a plurality of pixel vectors, each of the pixel vectors representing different respective pre-existing reference images stored in the storage section, and
the prediction signal generation section is further executed by the processor to produce the second prediction signal based on the observation matrix or the state vector.

6. A moving picture decoding method comprising:
receiving compressed data with an input section of a decoder device, the compressed data including an encoded differential signal obtained by prediction encoding a moving picture;
decoding the encoded differential signal with a decoding section included in the decoder device so as to produce a decoded differential signal;
producing a first prediction signal with a prediction signal generation section included in the decoder device, the first prediction signal produced with respect to the decoded differential signal;
adding the first prediction signal to the decoded differential signal with an adding section included in the decoder device, the first prediction signal added to the decoded differential signal to produce a reproduction signal;
storing the reproduction signal in a storage section included in the decoder device, the reproduction signal stored as a reference image referred to in producing a second prediction signal; and
generating an observation matrix using a matrix composed of a plurality of pixel vectors, each of the pixel vectors included in the matrix representing different respective pre-existing reference images stored in the storage section, the observation matrix generated with a reference image generation section included in the decoder device;
producing with the reference image generation section, based on the observation matrix, a new reference image;
storing the new reference image in the storage section by the reference image generation section; and
producing the second prediction signal with the prediction signal generation section, the second prediction signal produced using at least the new reference image.

7. A moving picture decoding method comprising:
receiving compressed data with an input section of a decoder device, the compressed data including an encoded differential signal obtained by prediction encoding a moving picture;
decoding the encoded differential signal with a decoding section included in the decoder device so as to produce a decoded differential signal;
producing a first prediction signal with respect to the decoded differential signal by a prediction signal generation section included in the decoder device;
adding the first prediction signal to the decoded differential signal with an adding section included in the decoder device so as to produce a reproduction signal;
storing the reproduction signal in a storage section as a reference image that is referred to in producing a second prediction signal; and
the prediction signal generation section generating at least one of an observation matrix or a state vector using a matrix composed of a plurality of pixel vectors, each of the pixel vectors representing different respective pre-existing reference images stored in the storage section to produce the second prediction signal based on the observation matrix or the state vector.

8. A non-transitory computer readable storage medium for a moving picture encoding and decoding system, the computer readable storage medium comprising instructions for moving picture decoding that cause a computer to execute:
an input section to receive compressed data including an encoded differential signal obtained by prediction encoding a moving picture;
a decoding section to decode the encoded differential signal so as to produce a decoded differential signal;
a prediction signal generation section to produce a first prediction signal with respect to the decoded differential signal;
an adding section to add the first prediction signal to the decoded differential signal so as to produce a reproduction signal;
a storage section to store the reproduction signal as a reference image referred to in producing a second prediction signal; and
a reference image generation section to generate an observation matrix using a matrix composed of a plurality of pixel vectors, each of the pixel vectors representing different respective pre-existing reference images stored in the storage section, to produce, based on the observation matrix, a new reference image, and to store the new reference image in the storage section, wherein
the prediction signal generation section produces the second prediction signal by using at least the new reference image.

9. A non-transitory computer readable storage medium for a moving picture encoding and decoding system, the computer readable storage medium comprising instructions for moving picture decoding that cause a computer to execute:
an input section to receive compressed data including an encoded differential signal obtained by prediction encoding a moving picture;
a decoding section to decode the encoded differential signal so as to produce a decoded differential signal;
a prediction signal generation section to produce a first prediction signal with respect to the decoded differential signal;
an adding section to add the first prediction signal to the decoded differential signal so as to produce a reproduction signal; and
a storage section to store the reproduction signal as a reference image referred to in producing a second prediction signal, wherein
the prediction signal generation section to generate at least one of an observation matrix or a state vector by using a matrix composed of a plurality of pixel vectors, each of the pixel vectors representing different respective pre-existing reference images stored in the storage section, and to produce the second prediction signal based on the observation matrix or the state vector.

10. A moving picture decoding device comprising:
a processor;
an input section executed by the processor to receive compressed data including an encoded differential signal obtained by prediction encoding a moving picture;
an entropy decoding section executed by the processor to restore from the compressed data at least the encoded differential signal of a target region serving as a decoding target;
a decoding section executed by the processor to decode the encoded differential signal of the target region so as to produce a decoded differential signal;
a prediction signal generation section executed by the processor to produce a first prediction signal of the target region with respect to the decoded differential signal;
an adding section executed by the processor to add the first prediction signal to the decoded differential signal so as to produce a reproduction signal of the target region;
a storage section operable to store the reproduction signal of the target region as a reference image referred to in producing a second prediction signal; and
a reference image generation section executed by the processor to obtain an observation matrix using a matrix comprising a plurality of pixel vectors, each of the pixel vectors representing a respective pre-existing reference image stored in the storage section,
the reference image generation section further executed by the processor to produce, based on the observation matrix, a new reference image, and to store the new reference image in the storage section, wherein,
the entropy decoding section is further executed by the processor to decode from the compressed data positional information specifying an insertion position of the new reference image in a reference image list controlling a plurality of reference images;
the prediction signal generation section is further executed by the processor to update the reference image list based on the positional information specifying the insertion position of the new reference image;
the entropy decoding section is further executed by the processor to decode from the compressed data a reference image number specifying the reference image used in producing the second prediction signal of the target region based on the updated reference image list; and
the prediction signal generation section is further executed by the processor to produce the second prediction signal of the target region by using the reference image specified by the decoded reference image number.

11. A moving picture decoding device comprising:
a processor;
an input section executed by the processor to receive compressed data including an encoded differential signal obtained by prediction encoding a moving picture;
an entropy decoding section executed by the processor to restore from the compressed data at least the encoded differential signal of a target region serving as a decoding target;
a decoding section executed by the processor to decode the encoded differential signal of the target region so as to produce a decoded differential signal;
a prediction signal generation section executed by the processor to produce a first prediction signal of the target region with respect to the decoded differential signal;
an adding section executed by the processor to add the first prediction signal to the decoded differential signal so as to produce a reproduction signal of the target region;
a storage section operable to store the reproduction signal of the target region as a reference image referred to in producing a second prediction signal; and
a reference image generation section executed by the processor to obtain an observation matrix by using a matrix comprising a plurality of pixel vectors, each of the pixel vectors representing a respective pre-existing reference image stored in the storage section, the reference image generation section further executed by the processor to produce, based on the observation matrix, a new reference image, and to store the new reference image in the storage section, wherein the entropy decoding section is further executed by the processor to decode from the compressed data positional information specifying an insertion position of the new reference image in a reference image list controlling a plurality of reference images relating to a large region composed of at least two target regions;

the prediction signal generation section is further executed by the processor to update the reference image list relating to the large region based on the positional information specifying the insertion position of the new reference image;

the entropy decoding section is further executed by the processor to decode from the compressed data a reference image number specifying the reference image used in producing the second prediction signal of the target region based on the updated reference image list; and the prediction signal generation section is further executed by the processor to produce the second prediction signal of the target region by using the reference image specified by the decoded reference image number.

12. The moving picture decoding device according to claim 10, wherein the entropy decoding section is further executed by the processor to decode the positional information showing that the new reference image is not included in the reference image list, and the prediction signal generation section is further executed by the processor to update the reference image list in such a manner that the reference image list does not include the new reference image.

13. The moving picture decoding device according to claim 10, wherein the reference image generation section is further executed by the processor to obtain the observation matrix and a state vector based on the matrix comprising the plurality of pixel vectors, and to produce the new reference image based on the observation matrix and the state vector.

14. The moving picture decoding device according claim 10, wherein the compressed data further includes vector compressed data corresponding to a state vector;

the decoding section is further executed by the processor to restore the vector compressed data so as to produce a decoded state vector within the decoded differential signal; and the reference image generation section is further executed by the processor to produce the new reference image based on the observation matrix and the decoded state vector.

15. The moving picture decoding device according to claim 13, wherein the reference image generation section is further executed by the processor to obtain at least one of the observation matrix and the state vector by carrying out singular value decomposition on the matrix comprising the plurality of pixel vectors so as to produce the new reference image.

16. A moving picture decoding device comprising:
a processor;

an input section executed by the processor to receive compressed data including an encoded differential signal obtained by prediction encoding a moving picture;

an entropy decoding section executed by the processor to restore from the compressed data at least the encoded differential signal of a target region serving as a decoding target;

a decoding section executed by the processor to decode the encoded differential signal of the target region so as to produce a decoded differential signal;

a prediction signal generation section executed by the processor to produce a first prediction signal of the target region with respect to the decoded differential signal;

an adding section executed by the processor to add the first prediction signal to the decoded differential signal so as to produce a reproduction signal of the target region; and a storage section operable to store the reproduction signal of the target region as a reference image referred to in producing a second prediction signal, wherein the entropy decoding section is further executed by the processor to decode from the compressed data positional information specifying an insertion position of the new reference image in a reference image list controlling a plurality of reference images;

the prediction signal generation section is further executed by the processor to update the reference image list based on the positional information specifying the insertion position of the new reference image, and to obtain an observation matrix by using a matrix comprising a plurality of pixel vectors, each of the pixel vectors representing a respective pre-existing reference image stored in the storage section;

the prediction signal generation section is further executed by the processor to produce a new reference image based on the observation matrix, and to store the new reference image in the storage section;

the entropy decoding section is further executed by the processor to decode from the compressed data a reference image number specifying the reference image used in producing the second prediction signal of the target region based on the updated reference image list; and the prediction signal generation section is further executed by the processor to produce the second prediction signal of the target region by using the reference image specified by the decoded reference image number.

17. A moving picture decoding method comprising:

receiving compressed data with an input section included in a decoder device, the compressed data including an encoded differential signal obtained by prediction encoding a moving picture;

restoring at least the encoded differential signal of a target region serving as a decoding target from the compressed data with an entropy decoding section included in the decoder device;

decoding the encoded differential signal of the target region with a decoding section of the decoder device so as to produce a decoded differential signal;

producing a first prediction signal of the target region with respect to the decoded differential signal with a prediction signal generation section included in the decoder device;

adding the first prediction signal to the decoded differential signal with an adding section included in the decoder device so as to produce a reproduction signal of the target region;

storing the reproduction signal of the target region with a storage section included in the decoder device, the reproduction signal of the target region stored as a reference image referred to in producing a second prediction signal;

obtaining an observation matrix with a reference image generation section included in the decoder device using a matrix comprising a plurality of pixel vectors, each of the pixel vectors representing a respective pre-existing reference image stored in the storage section, producing with the reference image generation section, based on the observation matrix, a new reference image, and storing the new reference image in the storage section;

decoding from the compressed data with the entropy decoding section positional information specifying an insertion position of the new reference image in a reference image list controlling a plurality of reference images;

updating the reference image list with the prediction signal generation section based on the positional information specifying the insertion position of the new reference image;

decoding from the compressed data with the entropy decoding section a reference image number specifying the reference image used in producing the second prediction signal of the target region based on the updated reference image list; and producing the second prediction signal of the target region with the prediction signal generation section using the reference image specified by the decoded reference image number.

18. A moving picture decoding method comprising:

receiving compressed data with an input section included in a decoder device, the compressed data including an encoded differential signal obtained by prediction encoding a moving picture;

restoring at least the encoded differential signal of a target region serving as a decoding target from the compressed data with an entropy decoding section included in the decoder device;

decoding the encoded differential signal of the target region with a decoding section included in the decoder device so as to produce a decoded differential signal;

producing a first prediction signal of the target region with respect to the decoded differential signal with a prediction signal generation section included in the decoder device;

adding the first prediction signal to the decoded differential signal with an adding section included in the decoder device so as to produce a reproduction signal of the target region;

storing the reproduction signal of the target region with a storage section included in the decoder device as a reference image referred to in producing a second prediction signal;

obtaining an observation matrix with a reference image generation section included in the decoder device by using a matrix comprising a plurality of pixel vectors, each of the pixel vectors representing a respective pre-existing reference image stored in the storage section;

producing with the reference image generation section, based on the observation matrix, a new reference image, and storing the new reference image in the storing section;

decoding from the compressed data with the entropy decoding section positional information specifying an insertion position of the new reference image in a reference image list controlling a plurality of reference images relating to a large region composed of at least two target regions;

updating with the prediction signal generation section the reference image list relating to the large region based on the positional information specifying the insertion position of the new reference image;

decoding from the compressed data with entropy decoding section a reference image number specifying the reference image used in producing the second prediction signal of the target region based on the updated reference image; and producing the second prediction signal of the target region with the prediction signal generation section using the reference image specified by the decoded reference image number.

19. The moving picture decoding method according to claim 17, wherein restoring at least the encoded differential signal of the target region serving as the decoding target from the compressed data further comprises decoding the positional information showing that the new reference image is not included in the reference image list; and producing the second prediction signal further comprises updating the reference image list in such a manner that the reference image list does not include the new reference image.

20. A moving picture decoding method comprising:

receiving compressed data including an encoded differential signal obtained by prediction encoding a moving picture with an input section included in a decoding device;

restoring at least the encoded differential signal of a target region serving as a decoding target from the compressed data with an entropy decoding section included in the decoding device;

decoding the encoded differential signal of the target region with a decoding section included in the decoding device so as to produce a decoded differential signal;

producing a first prediction signal of the target region with respect to the decoded differential signal with a prediction signal generation section included in the decoding device;

adding the first prediction signal to the decoded differential signal with an adding section included in the decoding device so as to produce a reproduction signal of the target region;

storing the reproduction signal of the target region with a storage section included in the decoder device, the reproduction signal stored as a reference image referred to in producing a second prediction signal;

decoding from the compressed data with the entropy decoding section positional information specifying an insertion position of a new reference image in a reference image list controlling a plurality of reference images;

updating the reference image list with the prediction signal generation section based on the positional information specifying the insertion position of the new reference image;

obtaining an observation matrix with the prediction signal generation section using a matrix comprising a plurality of pixel vectors, each of the pixel vectors representing a respective pre-existing reference image stored in the storage section;

producing a new reference image with the prediction signal generation section based on the observation matrix;

storing the new reference image in the storage section with the prediction signal generation section;

decoding from the compressed data with the entropy decoding section a reference image number specifying the new reference image used in producing the second prediction signal of the target region based on the updated reference image list; and producing the second prediction signal of the target region with the prediction signal generation section using the new reference image specified by the decoded reference image number.

21. The moving picture decoding device according to claim 11, wherein the entropy decoding section is further executed by the processor to decode the positional information showing that the new reference image is not included in the reference image list, and the prediction signal generation section is further executed by the processor to update the reference image list in such a manner that the reference image list does not include the new reference image.

22. The moving picture decoding device according to claim 11, wherein the reference image generation section is further executed by the processor to obtain the observation matrix and a state vector based on the matrix comprising the plurality of pixel vectors and to produce the new reference image based on the observation matrix and the state vector.

23. The moving picture decoding device according claim 11, wherein the compressed data further includes vector compressed data corresponding to a state vector;

the decoding section is further executed by the processor to restore the vector compressed data so as to produce a decoded state vector within the decoded differential signal; and the reference image generation section is further executed by the processor to produce the new reference image based on the observation matrix and the decoded state vector.

24. The moving picture decoding device according to claim 22, wherein the reference image generation section is further executed by the processor to obtain at least one of the observation matrix and the state vector by carrying out singular value decomposition on the matrix comprising the plurality of pixel vectors so as to produce the new reference image.

25. The moving picture decoding method according to claim 18, wherein restoring at least the encoded differential signal of the target region serving as the decoding target from the compressed data further comprises decoding the positional information showing that the new reference image is not included in the reference image list; and producing the second prediction signal further comprises updating the reference image list in such a manner that the reference image list does not include the new reference image.

* * * * *